United States Patent [19]

Koujiya et al.

[11] Patent Number: 5,685,567
[45] Date of Patent: Nov. 11, 1997

[54] SEAT BELT TIGHTENING DEVICE

[75] Inventors: Mutsumasa Koujiya, Toyota; Yutaka Ohasi, Handa; Kazuyoshi Isaji; Shinichi Iwai, both of Kariya, all of Japan

[73] Assignee: Nippondenso Co., Ltd., Kariya, Japan

[21] Appl. No.: 405,135

[22] Filed: Mar. 16, 1995

[30] Foreign Application Priority Data

Mar. 16, 1994 [JP] Japan .................. 6-072607
May 31, 1994 [JP] Japan .................. 6-118957

[51] Int. Cl.$^6$ ........................ B60R 22/46
[52] U.S. Cl. ............... 280/806; 280/801.1; 297/480
[58] Field of Search ............... 280/806, 801.1; 297/480

[56] References Cited

U.S. PATENT DOCUMENTS

| 4,913,497 | 4/1990  | Knabel et al.   |         |
|-----------|---------|-----------------|---------|
| 5,129,679 | 7/1992  | Specht et al.   |         |
| 5,288,105 | 2/1994  | Ikegaya et al.  | 297/480 |
| 5,290,062 | 3/1994  | Fohl            | 280/801 |
| 5,374,110 | 12/1994 | Hiramatsu       | 297/480 |

FOREIGN PATENT DOCUMENTS

| 318127     | 5/1989  | European Pat. Off. |         |
| 9108781.3  | 12/1991 | Germany .          |         |
| 4137211    | 5/1992  | Germany .          |         |
| 4101977    | 7/1992  | Germany .          |         |
| 4311214    | 10/1993 | Germany            | 280/806 |
| 4-31783    | 2/1992  | Japan .            |         |
| 4-63746    | 2/1992  | Japan .            |         |
| 5 42013    | 6/1993  | Japan .            |         |
| 5-193443   | 8/1993  | Japan .            |         |

*Primary Examiner*—Eric D. Culbreth
*Attorney, Agent, or Firm*—Cushman, Darby & Cushman IP Group of Pillsbury Madison & Sutro LLP

[57] ABSTRACT

An arresting hook plate extending from a seatbelt buckle is attached to a buckle plate so that it moves freely along a straight line. When inertia force acts on the mass body inside a pull-in section casing, it leaves a lock state and is caused to move by the spring biasing force. The arresting hook plate attached to the mass body by a wire is caused to be pulled in along with movement of the mass body. A pair of locking pawls included on the buckle plate prevent movement of the arresting hook plate in a pull-out direction when they are in a locked position. There is also an locking pawl holder which is used to select and set the locking or release of the locking pawls. If the locking of the locking pawls is released so that the mass body is returned to the origin position against the spring biasing force by means of the arresting hook plate via the wire, the mass body is placed again in a lock state due to the retainer.

21 Claims, 26 Drawing Sheets

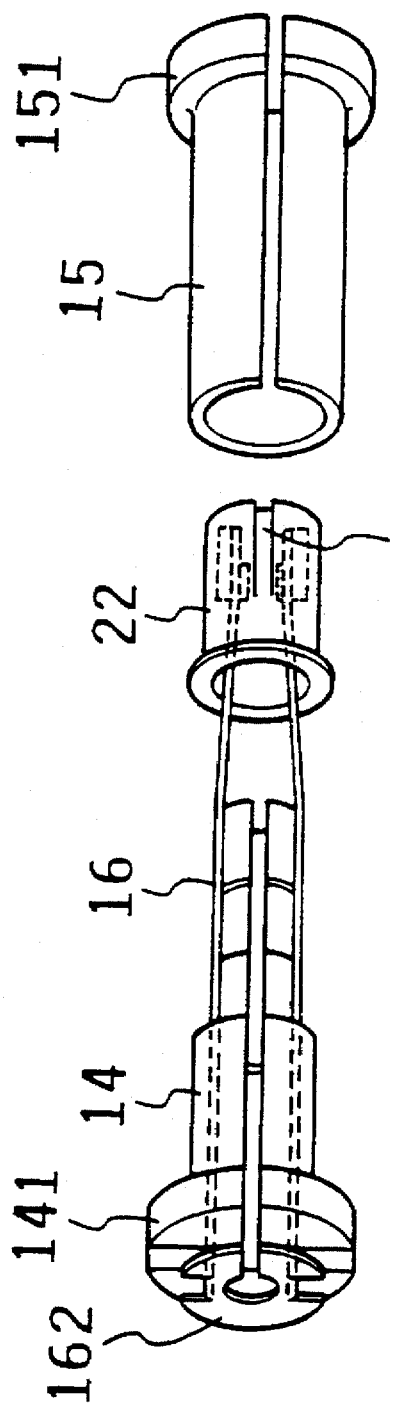
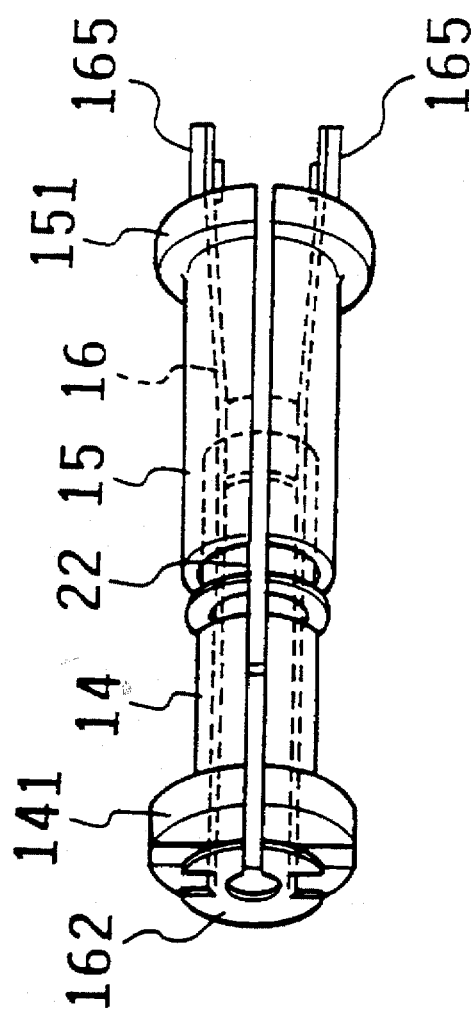
FIG. 6A
FIG. 6B

SEAT BELT TIGHTENING DEVICE

CROSS REFERENCE TO RELATED APPLICATIONS

This application is based upon and claims priority from Japanese Patent Application No. Hei 6-172607 filed Mar. 16, 1994 and Japanese Patent Application No. Hei. 6-118957 filed May 31, 1994, with the contents of each document being incorporated herein by reference.

BACKGROUND OF THE INVENTION

1. Field of the Invention

This invention relates to a seat belt tightening device to tight up a seat belt when a vehicle is suddenly decelerated, more particularly, relates to a tightening device having an especially compact structure and being able to reset for reuse.

2. Description of the Related Art

Seat belt tightening devices are designed to suddenly tight up the seat belt and remove a slack of the seat belt, thus providing physical protection for passengers together with locking of a retractor. In response to demands in recent years for smaller devices, several devices have been proposed which pull in a seat belt buckle, etc. by using a spring force of a coil spring.

For example, Japanese Patent Application Laid-Open 5-193443 (1st conventional example), Japanese Patent Application Laid-Open 4-31783 (2nd conventional example), Japanese Patent Application Laid-Open 4-63746 (3rd conventional example) and Japanese Utility Model Application Laid-Open 5-42013 (4th conventional example).

Seat belt tightening devices usually include a pulling section having a coil spring, and a reverse preventing section to prevent pulling out of the seat belt buckle along with movement of the passenger's body.

In both the 1st conventional example and 2nd conventional example, a reverse preventing section is disclosed, which has sawtooth engaging to prevent pulling out of the seat belt buckle. However, no structure to pull out the seat belt buckle again after pulling in and use a preloader again is disclosed. Also, in the 3rd conventional example there is no detailed disclosure of the reverse preventing section.

In the 4th conventional example, a reset structure is presented for reuse of the seat belt tightening device. This mechanism, which operates in linked motion with forward movement of a seat back, is located with a comparatively complicated structure at a position near the seat back which is completely parted from a coil spring.

However, this is disadvantage from a point of space utility and is troublesome to push the seat back down every time to reset the mechanism.

SUMMARY OF THE INVENTION

The purpose of the present invention is to solve the above problems and to provide seat belt tightening device realizing a simple overall structure and more compact and being able to reset.

To achieve the purpose, a seat belt tightening device includes a suspension means for suspending a seat belt, a support means for supporting the suspension means, a holding means for holding the suspension means to move freely on a straight line, a pull-in means for pulling in the suspension means when inertia force over a predetermined value acts, a restricting means for restricting a movement of the suspension means at least in a pull-out direction, a restriction-release holding means for releasing a restrict state which restricts a movement by the restricting means and holding a released state of the restricting means during the suspension means is returned to initial position when the seat belt tightening device is reset, a restriction-return means for returning the released state of the restricting means to the restrict state by moving the suspension means in a pull-in direction when the suspension means is returned to the initial position.

With the structure in the above preferred mode, when the pull-in means moves due to the action of inertia force, the support means is moved in a pull-in direction via the connecting means. Having moved, the support means is prevented from moving at least in a pull-out direction by the restricting means locked with it, so that even if the passenger weight is impressed on the seat belt suspension means, it is not pulled out again.

When resetting the device, if the locking of the restricting means is released, the support means can freely be pulled out. If the support means is pulled out to return the pull-in means to the initial position, the pull-in means is locked again to reset the device.

In this way, resetting the device is possible with a simple operation in which the support means supporting the seat belt suspension means is simply pulled up.

With the structure in other preferred mode, sawtoothed hooks and pawls are biased and joined by a spring so that, even in a locked state, the hooks and pawls can go over their mutual slopes and the support means moves freely in a pull-in direction. The vertical surfaces of the hooks and pawls engage mutually in a pull-out direction so that their movement is stopped.

BRIEF DESCRIPTION OF THE DRAWINGS

FIGS. 6A and 6B are exploded views of the main spring guide means and holder;

DETAILED DESCRIPTION OF THE PRESENTLY PREFERRED EXEMPLARY EMBODIMENTS (Composition and operation of pull-in section of the tightening device.)

Figure 1:
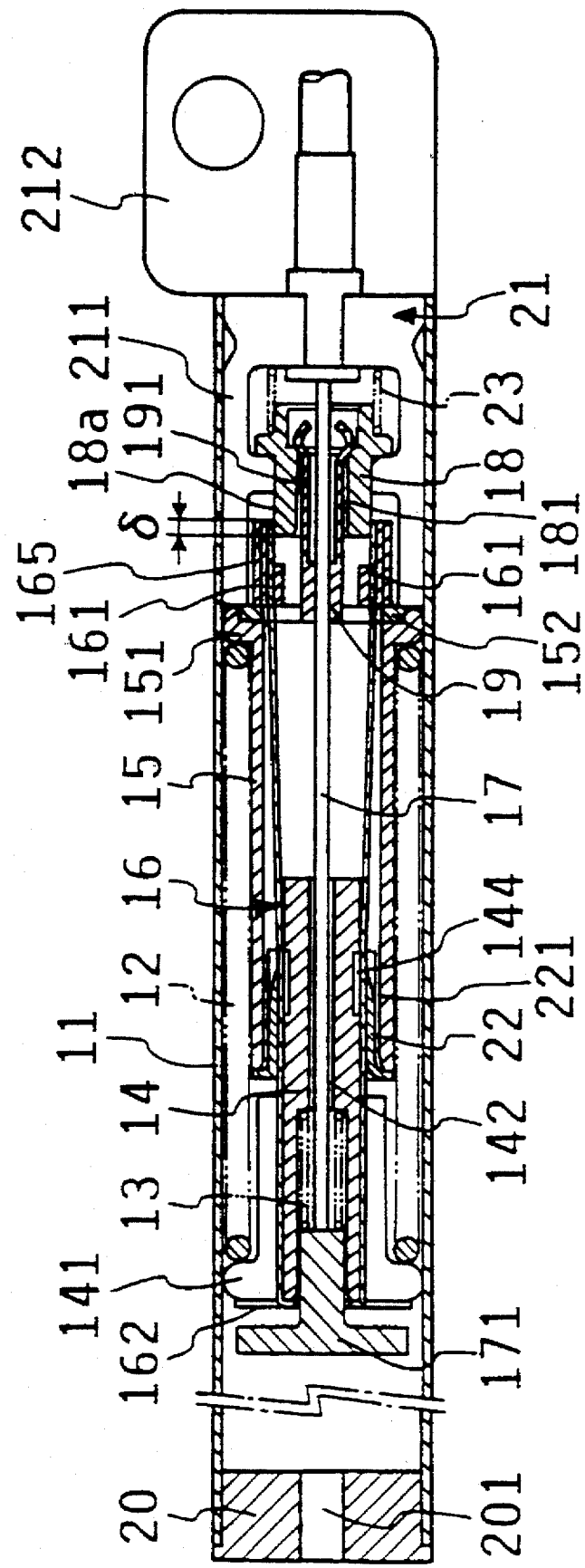
FIG. 1 is a full vertical cross-section view of the wire pulling section in the first embodiment of this invention.
Figure 2:
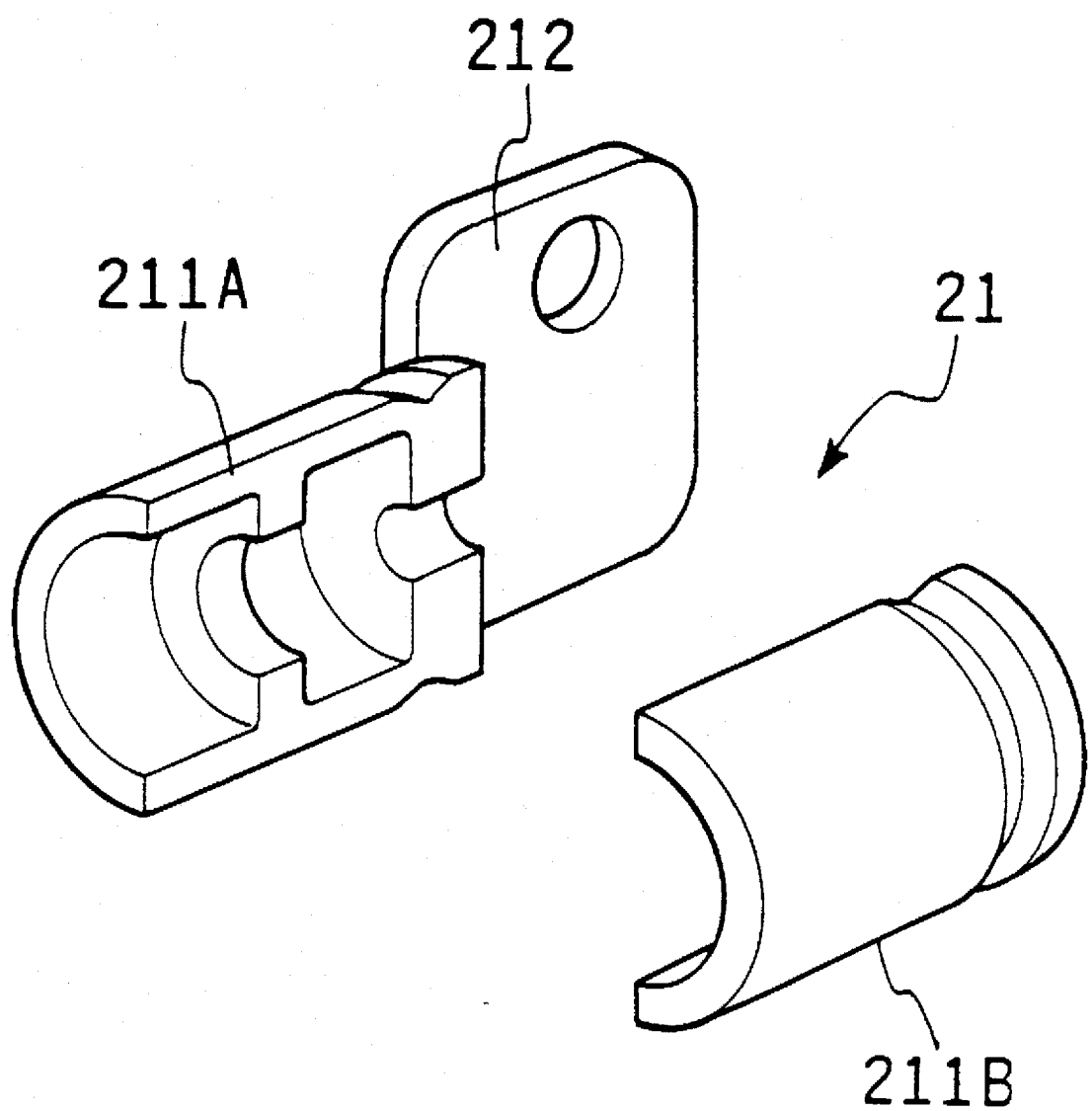
FIG. 2 is a perspective view of the housing means.

In FIG. 1 a casing 11 of the pull-in section is a metal cylinder which is installed in a longitudinal direction (sideways in the figure) to a vehicle floor not shown in the figure. The front end (left end in the figure) opening is closed with a cap 20 having an air hole 201. In the back end opening is located the cylinder-shaped main body 211 of the housing 21 and retained by pressure insertion. As shown in FIG. 2, the main body 211 is constructed by joining together the pair of half-cylinders 211A and 211B which are divided in half along the axis line. Included on the cylinder-half 211A is a rectangular connector 212 jutting outside of the casing 11.

Figure 3:
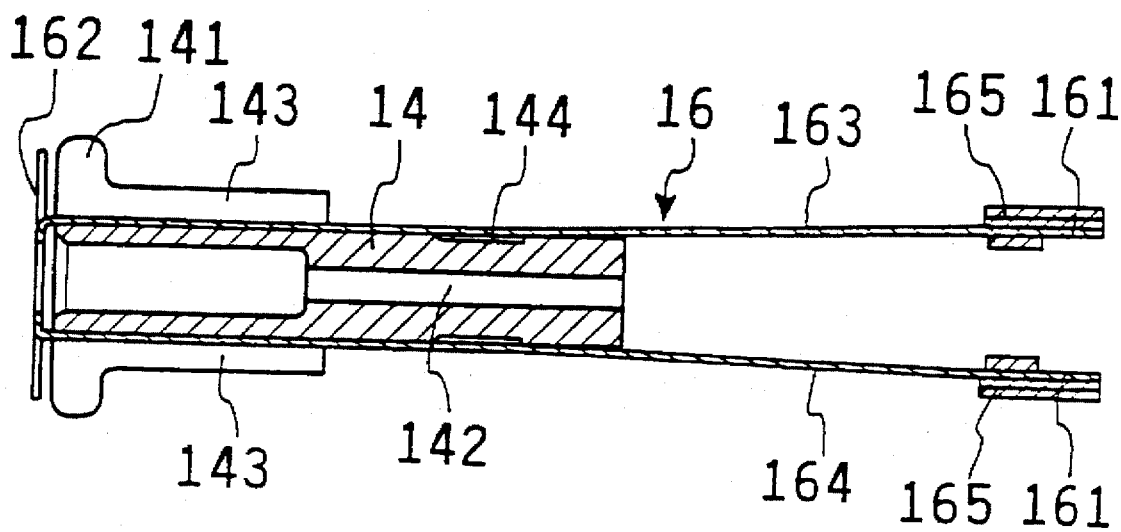
FIG. 3 is a partial cross-section view of the main spring guide means with plate spring.
Figure 4:
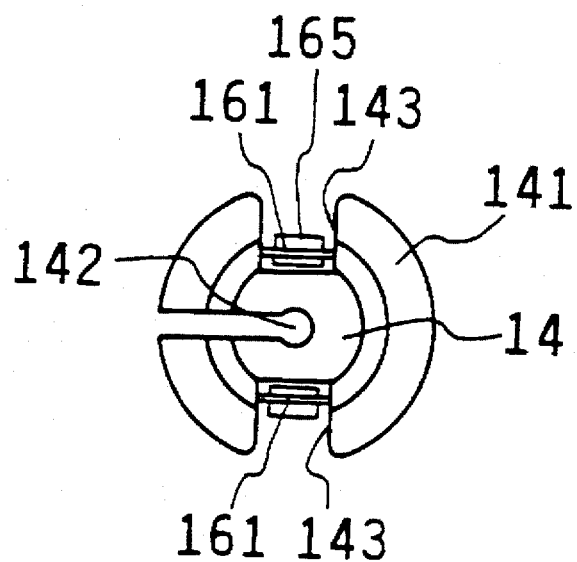
FIG. 4 is a side view of the main spring guide means seen from the back.

Located inside the closed casing 11 in FIG. 1 in a front-back direction are a main spring guide 14 as the front side mass body and a holder 15 as the back side mass body. As shown in FIG. 3 and FIG. 4, the main spring guide 14 is a metal cylinder including a through hole 142 where the front half has a large diameter and the back half has a small diameter. On the flange-shaped spring retainer 141 formed on the outer circumference are rectangular grooves 143 in two positions extending in an axial direction above and below. Attached to this is a plate spring 16 acting as a prevention means in which the opposing distance gradually widens going toward the back.

Figure 5:
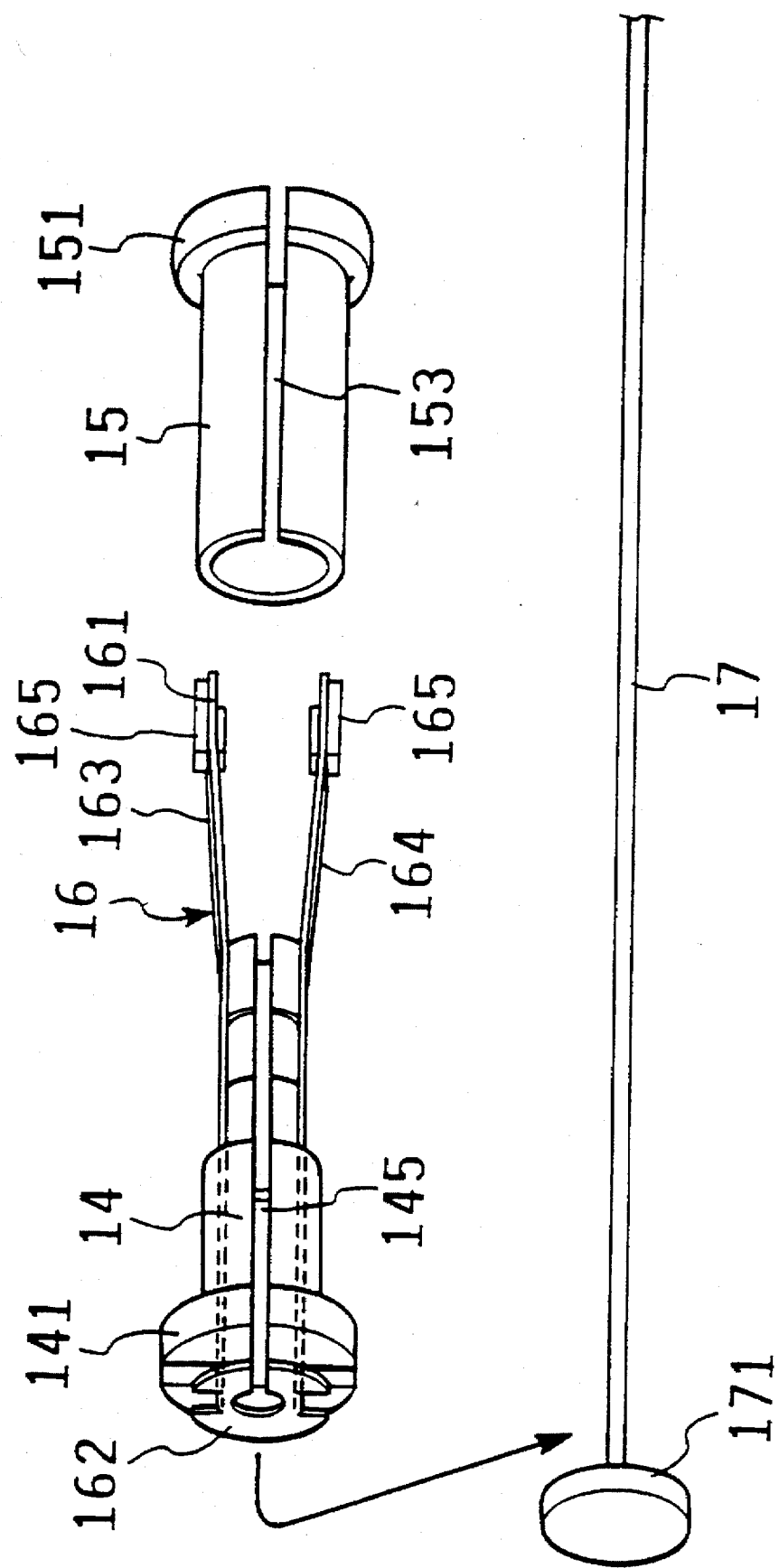
FIG. 5 is an exploded view of the main spring guide means and holder.

In other words, the plate spring 16 is formed by bending it into an abbreviated U-shape. As FIG. 5 shows, the base is a flange plate 162 extending along the end configuration of the main spring guide 14. The two legs 163, 164 of the plate spring 16 extend to the rear along in the grooves 143 on the top and bottom of the main spring guide 14, and a stopper 165 is crimped to the two tip ends 161.

In FIG. 1, the holder 15 is a metal cylinder with a large diameter to permit housing of the rear half of the main spring guide 14. A flange-shaped spring retainer 151 is formed as a protrusion around the entire outer circumference of the rear end. Inserted in the spring retainer 151 along the circumference of the opening is a metal ring 152. Contacting this is the edge of the stopper 165 of the plate spring end 161 which was passed through the interior of the holder 15.

The front end of the holder 15 contacts a holder ring 22 attached to the periphery of the main spring guide 14. The back end contacts the end of the housing 21. As for retention of the holder ring 22, as shown in FIG. 6A, the plate spring 16 is passed through the cylinder, and protrusions 221 formed at two locations on the surrounding wall of the holder ring (FIG. 1) and pushing out to the cylinder interior are secured by joining them with retention grooves 144 formed on the perimeter of the main spring guide 14. After attaching the holder ring 22, the plate spring 16 is additionally inserted in the holder 15 (FIG. 6B). Between the spring retainer 151 on the holder 15 and the spring retainer 141 on the main spring guide 14 is inserted the main coil spring 12 as the main spring in a retracted state. The strong extending spring force of the main coil spring 12 is received by the flange plate 162 and the stopper 165 of the plate spring 16 respectively contacting the ends of the spring retainers 141, 151.

Contacting both ends 161 of the plate spring 16 from the inside in FIG. 1 is the peripheral surface 18a of the block-shaped retainer 18 acting as a retention control means. The retainer 18 is located so that it is capable of rubbing motion back and forth in the interior of the housing 21. It is energized in a forward direction by the coil spring 23 located between the inner walls of the back end of the other housing 21.

A wire 17 acting as a connecting means to the front passes through the through hole 181 located in the center of the retainer 18. One end of the wire 17 extends to a reverse direction prevention section described below that is not included in the figure. The other end passes through the cylinder of the main spring guide 14 and is secured to a central protrusion on the round retainer plate 171 located toward the front of the spring guide at a determined distance. In order to simplify the process of threading the wire 17, the peripheral wall of the main spring guide 14 and the holder 15 is cut away in one section so that it is possible to easily insert the wire 17 from the side by passing through the cutaway spaces 145, 153 as shown in FIG. 5.

Located between the center protrusion end of the retainer 171 and the graded inner circumference of the main spring guide 14 is an auxiliary coil spring 13 with a weak spring force acting as an auxiliary spring means (FIG. 1). It supports in a forward direction the front/back main spring guides 14.

Attached to the center position of the wire 17 is a positioner 19. The curved end of a flexible claw 191 extending to the back from above and below is attached to the graded surface of the through hole 181 of the retainer 18. This makes it possible to position the retainer plate 171 on the end of the wire 17.

Figure 7:
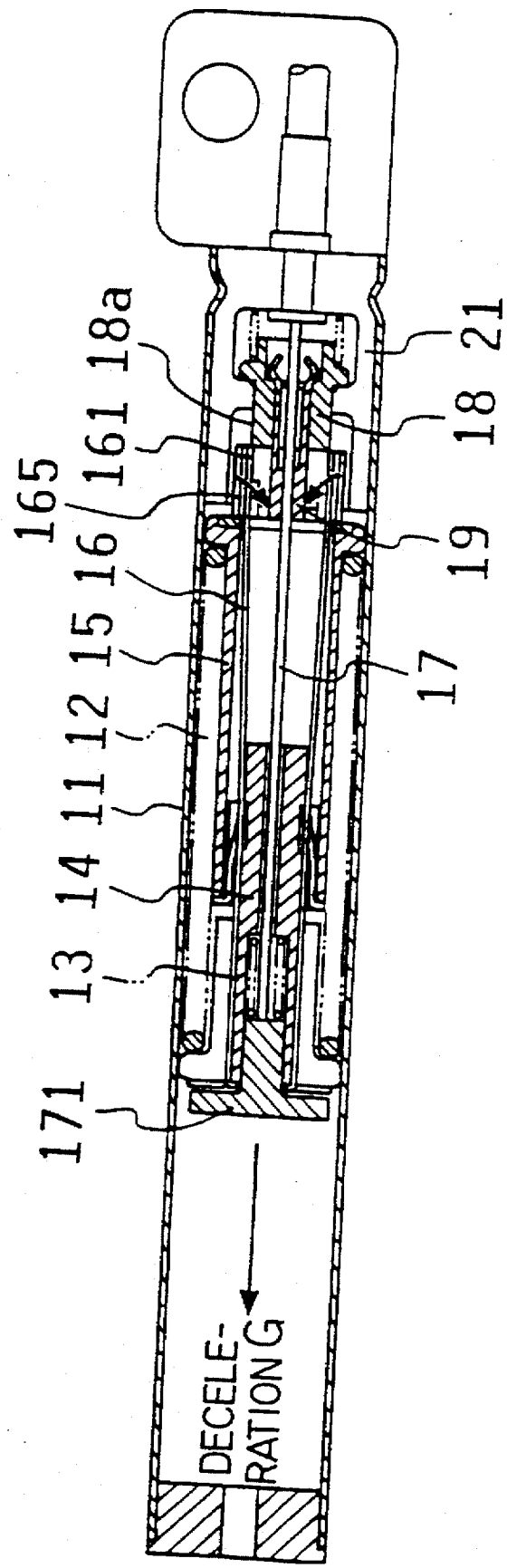
FIG. 7 is a cross-section view of the wire-pull-in section to describe operation of the device.
Figure 8:
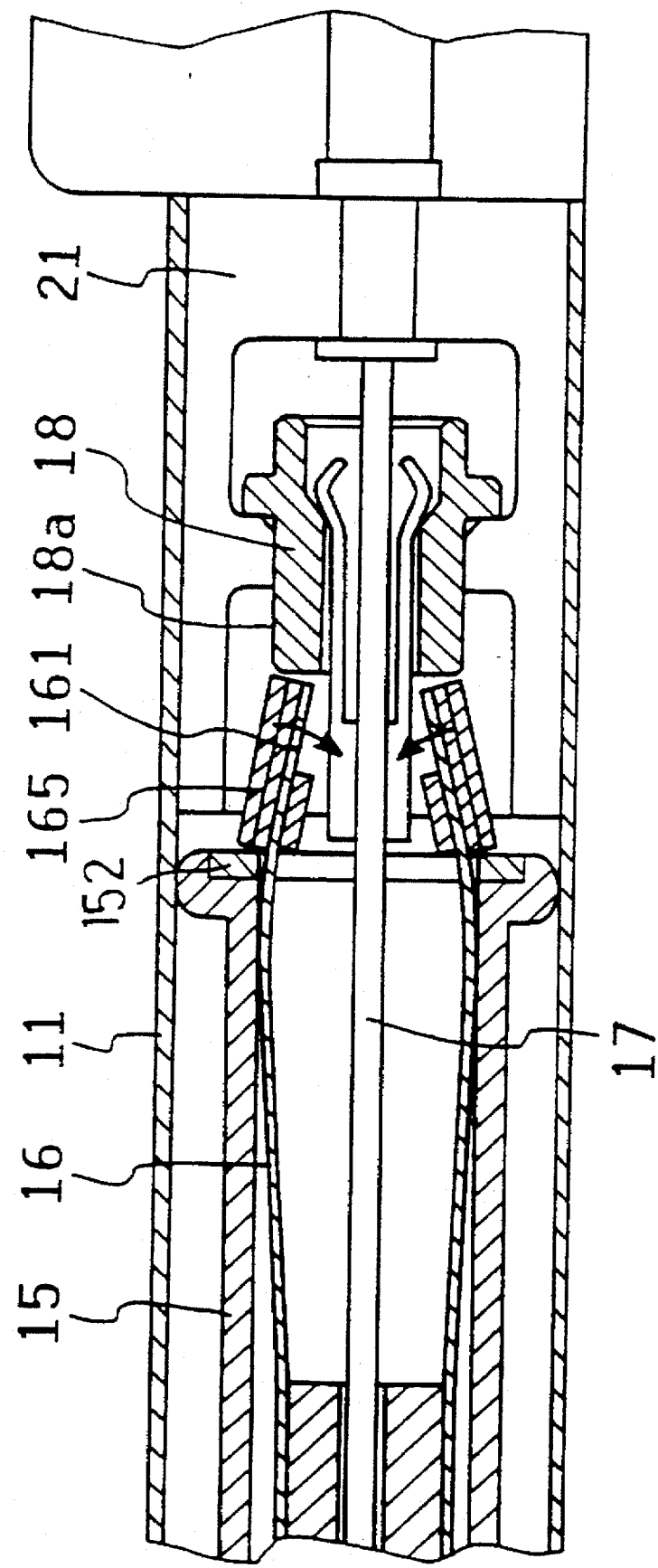
FIG. 8 is a partially enlarged cross-sectional view of the back part of the wire-pull-in section to describe operation of the device.
Figure 9:
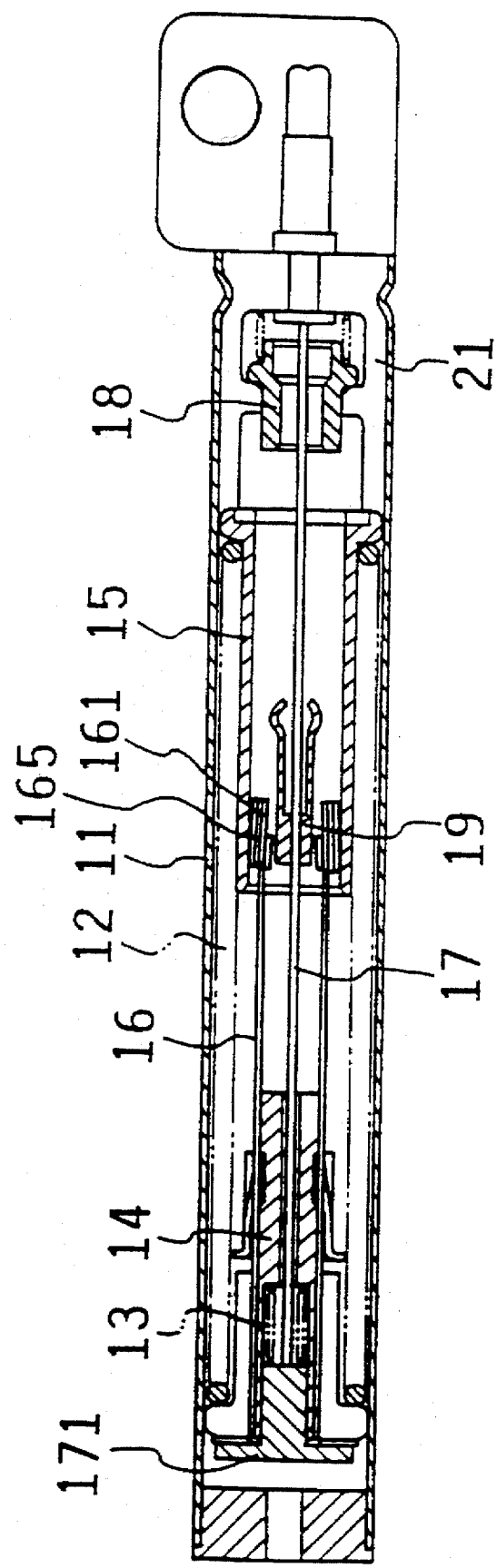
FIG. 9 is a cross-sectional view of the wire-pull-in section to describe operation of the device.

In the pull-in section of this construction, when the inertia acts in a forward direction on the main spring guide 14 and the holder 15 due to sudden deceleration of the vehicle, etc., both of them move forward while contracting the auxiliary coil spring 13 and the inside surface of the plate spring end 161 comes off from the peripheral surface 18a of the retainer 18 (FIG. 7). An inertial moment in the direction shown by the arrow G acts on the stopper 165 due to the load from the main coil spring 12. As a result, as shown in FIG. 8, the plate spring end 161 bends and inclines toward the inside, so that the locking of the end of the stopper 165 and the metal ring 152 is released. However, the main coil spring 12 extends and changes shape with a large amount of spring force (FIG. 9). As a result, the main spring guide 14 contacts the retention plate 171 and rapidly pushes it forward. Simultaneously, the wire 17 is also pulled forward with large force to carry out pulling in of the seat belt buckle as described below.

Also, even in a case where a large bending amount is created for the plate spring end 161, so that even if the friction coefficient for the stopper 165 and the metal ring 152 is large (e.g., when one is steel and the other is aluminum), it is still possible to smoothly carry out release of the lock state, thus increasing the range of selection of construction materials.

It is also possible to taper the covers of the stopper 165 or the metal ring 152 in order to carry out smoother lock release.

By appropriately setting the spring force of the auxiliary coil spring 13, it is possible to determine the inertial force by which the main spring guide 14 starts movement, so that it is possible to carry out pull-in operations not only in case of a sudden vehicle deceleration but also in case of climbing a grade or in poor road conditions.

Also, by adjusting the overlap between the rear end of the stopper 165 and the front end of the retainer 18 as indicated in FIG. 1 by δ, it is possible to appropriately set the duration time of the deceleration inertia in which pull-in operations are carried out.

Figure 10:
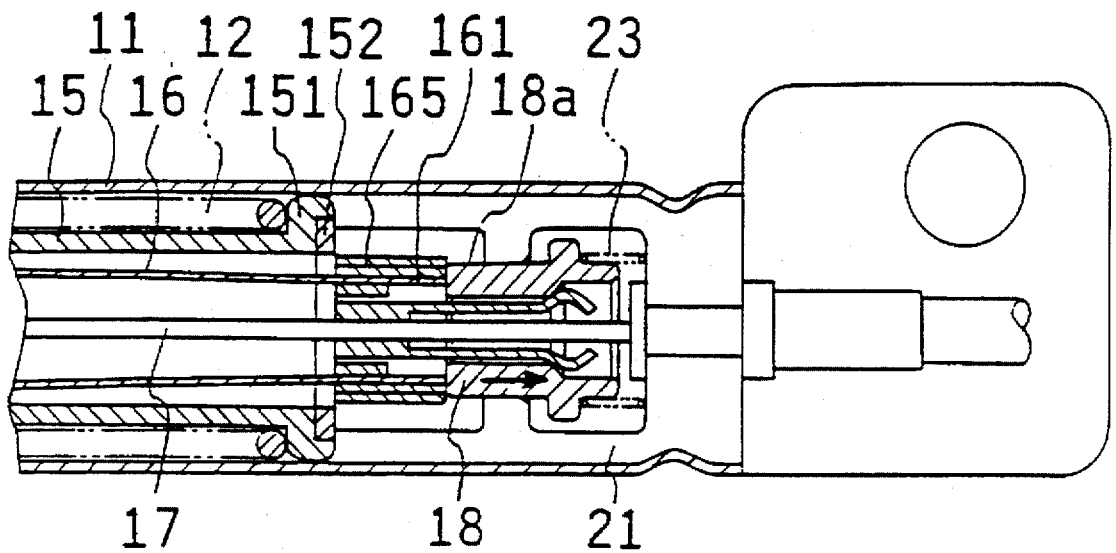
FIG. 10 is a cross-section enlargement view of the back part of the wire-pull-in section to describe operation of the device.
Figure 11:
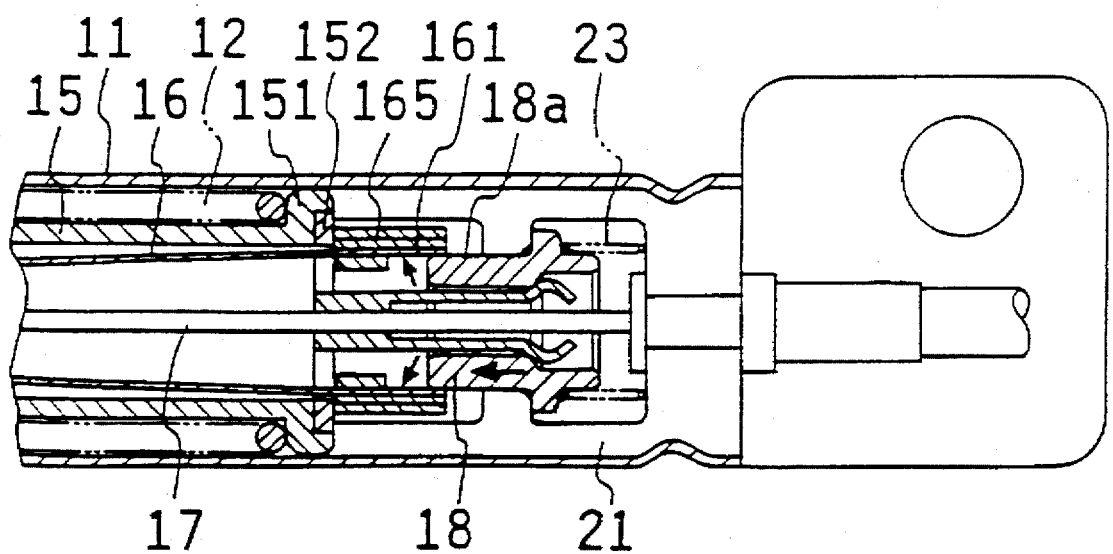
FIG. 11 is a cross-section enlargement view of the back part of the wire-pull-in section to describe operation of the device.

When resetting the pull-in section to the initial position after operation, the wire 17 is pulled to the back and the back end of the stopper 165 is brought into contact with the front end of the retainer 18 (FIG. 10). The retainer 18 of which back is supported by the coil spring 23 retreats along with retreat of the stopper 165 (direction shown by arrow), so that the end 161 of the plate spring 16 energized to the outside enters the space to the back of the spring retainer 151 of the holder, and the edge of the stopper 165 contacts and locks with the metal ring 152 (direction shown by arrow in FIG. 11). The retainer 18 then advances in this state in the direction shown by the arrow in the figure so that the peripheral surface 18a contacts the plate spring end 161 from the inside, thus preventing the stopper 165 from coming off the holder 15. In this way the pull-in section is returned to the state prior to operation.

(Structure and operation of the reverse preventing section of the seat belt tightening device)

Figure 12:
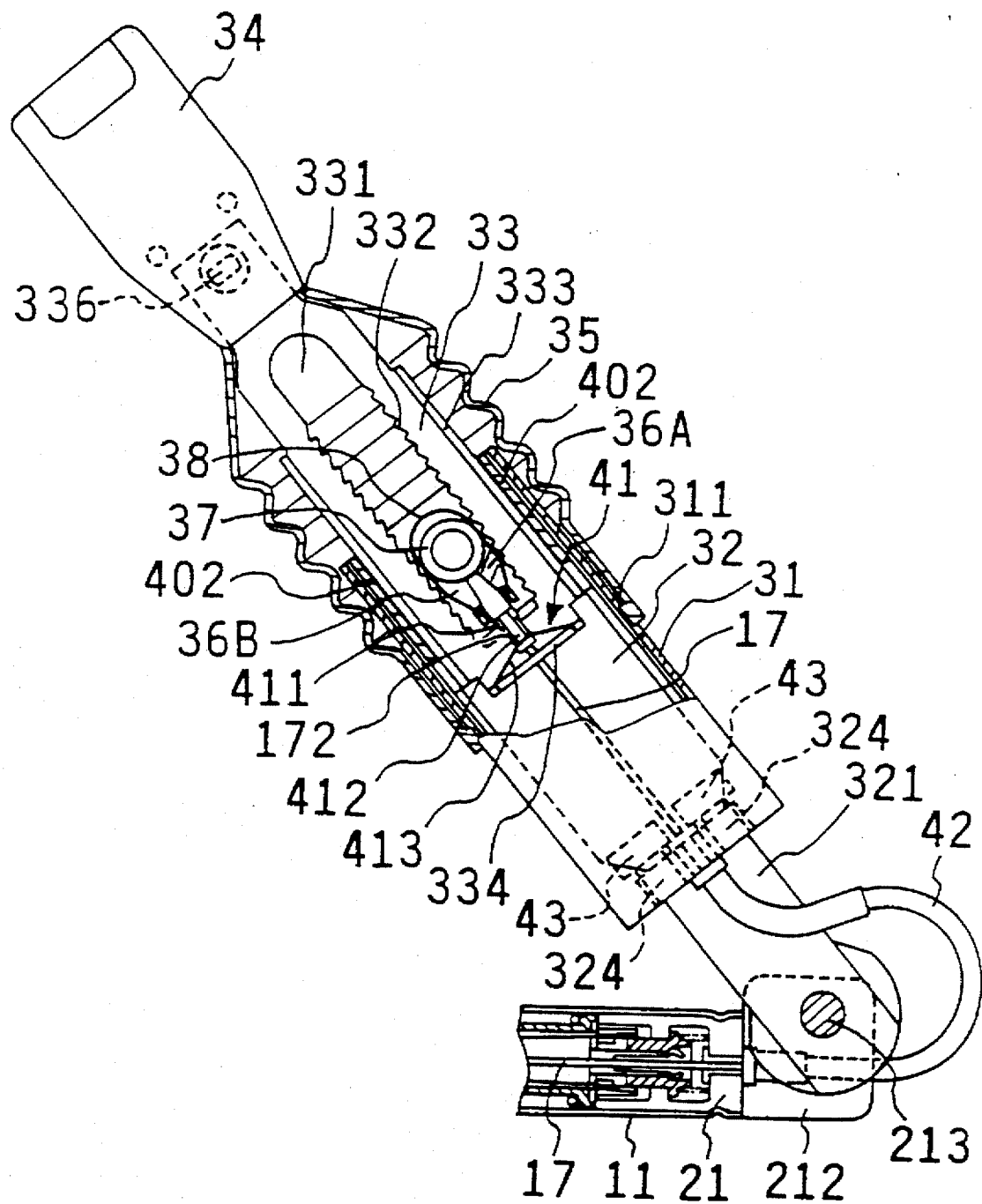
FIG. 12 is a cross-section view of the reverse stop means.

In FIG. 12, the retention cover 31 of the reverse prevention section has the form of a flat rectangular container. The lower end 321 of the back plate 32 which is the support means extending diagonally from the lower end of the retention cover 31 is pivotably attached by means of the axis 213 to the connecting section 212 extending from the back of the pull-in section casing.

Contacting the plate surface of the back plate 32 and slightly narrower is a reverse prevention hook plate 33 acting as a support means and capable of rubbing movement. The reverse prevention hook plate 33 is a long plate extending out as an extension of the back plate 32. A long hole 331 extending in a longitudinal direction is formed on the center of the long plate. A plurality of sawtooth hooks 332 is formed on the sides of the long hole 331 in a parallel configuration. A seat belt buckle 34 acting as the seat belt suspension means is secured to the upper end 336 of the reverse prevention hook plate 33. The entire reverse prevention hook plate 33 with the exception of the seat belt buckle 34 is accommodated in a movable cover 35 (FIG. 12). The movable cover 35 is in the shape of a flat rectangular container of which the entire surface is bellows-shaped and capable of expanding and contracting. The upper end opening is secured to the seat belt buckle 34 and the lower end opening is secured to a retention groove 311 on the surrounding wall of the retention cover 31.

Figure 14:
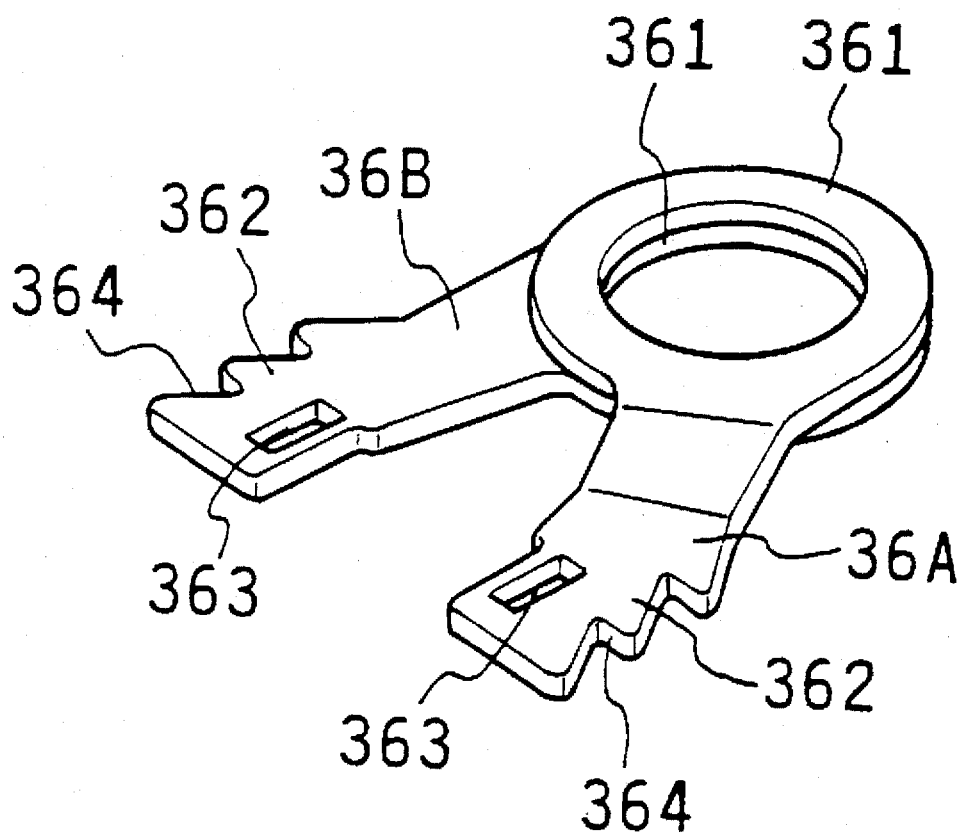
FIG. 14 is a perspective view of the reverse stop means.

Formed on the inside of the long hole 331 of the reverse prevention hook plate 33 on the left and right are reverse prevention locking pawls 36A, 36B. The reverse prevention locking pawls 36A, 36B, which are made of pressed metal plate and symmetrical with each other, are composed of a ring-shaped head section 361 on one end and a foot section 362 extending out from the head section 361. As shown in FIG. 14, the head 361 of one prevention locking pawl 36A has a different height than the other head 361 so that, when the heads 361 are piled, legs 362 are located on the same plane. Consequently, when the reverse prevention locking pawls 36A, 36B engages the hooks of the reverse prevention hook plate 33, a moment force is prevented to operate.

The heads 361 of the reverse prevention locking pawls 36A, 36B placed on top of each other are inserted in a cylindrical axis 37 inserted in the attachment hole 322 (FIG. 13) of the buckle plate 32 so that they can move freely around the axis 37. Long holes 363 are included in the ends of the legs 362 of the reverse prevention locking pawls 36A, 36B along the inner edge. The ends of the legs of the plate spring 38 are passed through the long holes 363 while bent in an inverted U-shape. In other words, the extension 381 extending the ends of the legs of the plate spring 38 to an orthogonal direction is inserted in the long holes 363. However, in the state in FIG. 12 where there is location in the long holes 331 of the reverse prevention hook plate 33, the reverse prevention locking pawls 36A, 36B are energized by the plate spring 38 to keep a certain distance between legs 362 (FIG. 14). The plurality of sawtoothed pawls 364 formed on the outer surface of the legs 362 spread in a V-shape engage with the hooks 332 of the reverse prevention hook plate 33 to stop its upward motion.

Figure 13:
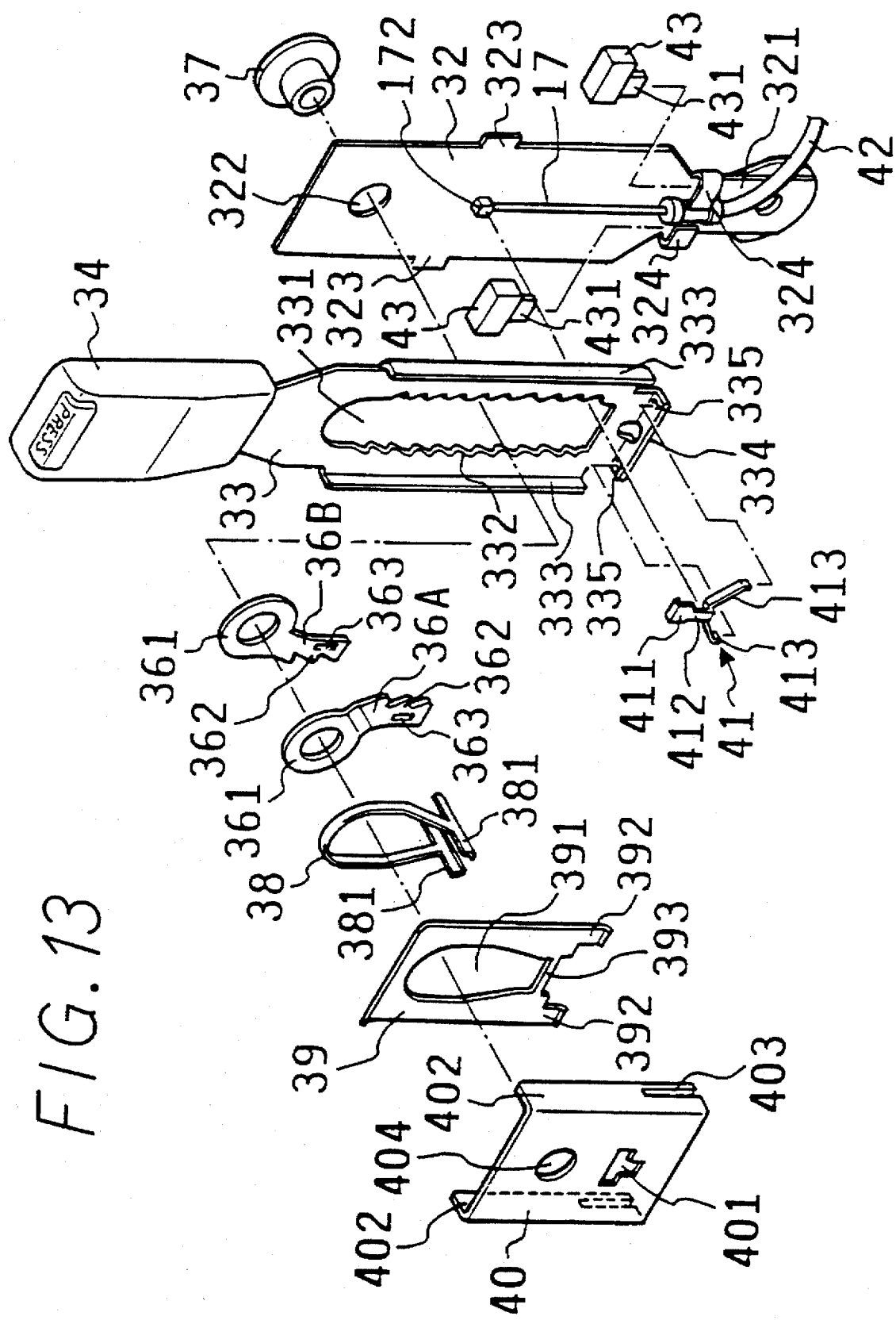
FIG. 13 is an exploded view of the reverse stop means.

In FIG. 13 the other end of the extension 381 on the end of the plate spring 38 passes through an opening 391 of a movable plate 39 formed on the plate spring 38 as well as the preventing pawls 36A, 36B. After this it extends to an upper level wide area section in the T-shaped opening 401 formed acting as a holder and found in the arresting pawl holder 40 acting as an engaging selection means. The movable plate 39 can move up and down within a set range inside the arresting pawl holder 40. The opening 391 is slightly larger than the external dimensions of the plate spring 38, so that the leg 392 juts downward from the left and right positions on the lower end.

The arresting pawl holder 40 is in the shape of a plate with both ends bent at a right angle to form the control walls 402. It is located in a way that it covers the movable plate 39. The control walls 402 on the left and right contact the outside surfaces of the reinforcement walls 33 constructed on both sides of the reverse prevention hook plate 33, thus preventing it from bending to the outside. The arresting pawl holder 40 contains a notch 403 formed in the lower end of the control walls 402 on the left and right. The notches 403 are engaged to rectangular protrusions 323 formed on the left and right sides of the buckle plate 32. Passing through an attachment hole 404 created on the plate surface of the arresting pawl holder 40 is the axis 37 which has been passed through the head 361 formed by combining the reverse preventing pawls 36A, 36B. The cylindrical wall of the axis 37 is extended and bent on the end of the axis, thus joining the arresting pawl holder 40 to the buckle plate 32.

In FIG. 12 the rectangular head 411 of the plate spring 41 acting as the lock release prevention means is passed between the reverse prevention locking pawls 36A, 36B located at a distance from each other to the left and right, thus reverse prevention locking pawls 36A, 36B from moving toward the inside. As a result, the locking pawls 36A, 36B in this state cannot come off the hooks 332 of the arresting hook plate 33, so that the arresting hook plate 33 (i.e., the seat belt buckle 34) is prevented from moving in either an upward or downward direction. In addition, the upper edge of the head 411 creates an abbreviated U-shape surface in the direction of the buckle plate 32 and is bent (FIG. 13), making it possible to increase strength in the width direction of the head 411 while allowing it to move onto the locking pawls 36A, 36B as described below.

The plate spring 41 has leg sections 413 extending out in a V-shape from the head 411 via the connecting section 412. The ends of the leg sections 413 are inserted in the attachment hole 335 of stopper wall 334 formed in the lower end of the arresting hook plate 33. Attached to the connecting section 412 of the plate spring 41 is the block-shaped end 172 of the wire 17 extending from the pull-in section casing 11 after passing through the flexible tube 42.

At the border between the buckle plate 32 and the main unit, the two ends of the plate are extended and bent forward to create retainers 324. These retainers 324 are used to hold and retain one end of the flexible tube 42. Crimped to the space of the retainers 324 on the left and right are the convex lower surfaces 431 of the rectangular rubber stoppers 43.

When there is pulling in of the wire 17 in the pull-in section by the process described above, the wire 17 moves downward in the reverse preventing section so that the block-shaped end 172 contacts the lower stopper wall 334 of the reverse arresting hook plate 33. At the same time, because the leg 413 of the spring plate 41 bends in a downward direction, the head 411 comes out from between the locking pawls 36A, 36B on the left and right, thus allowing the locking pawls 36A, 36B to move toward the inside.

Figure 15:
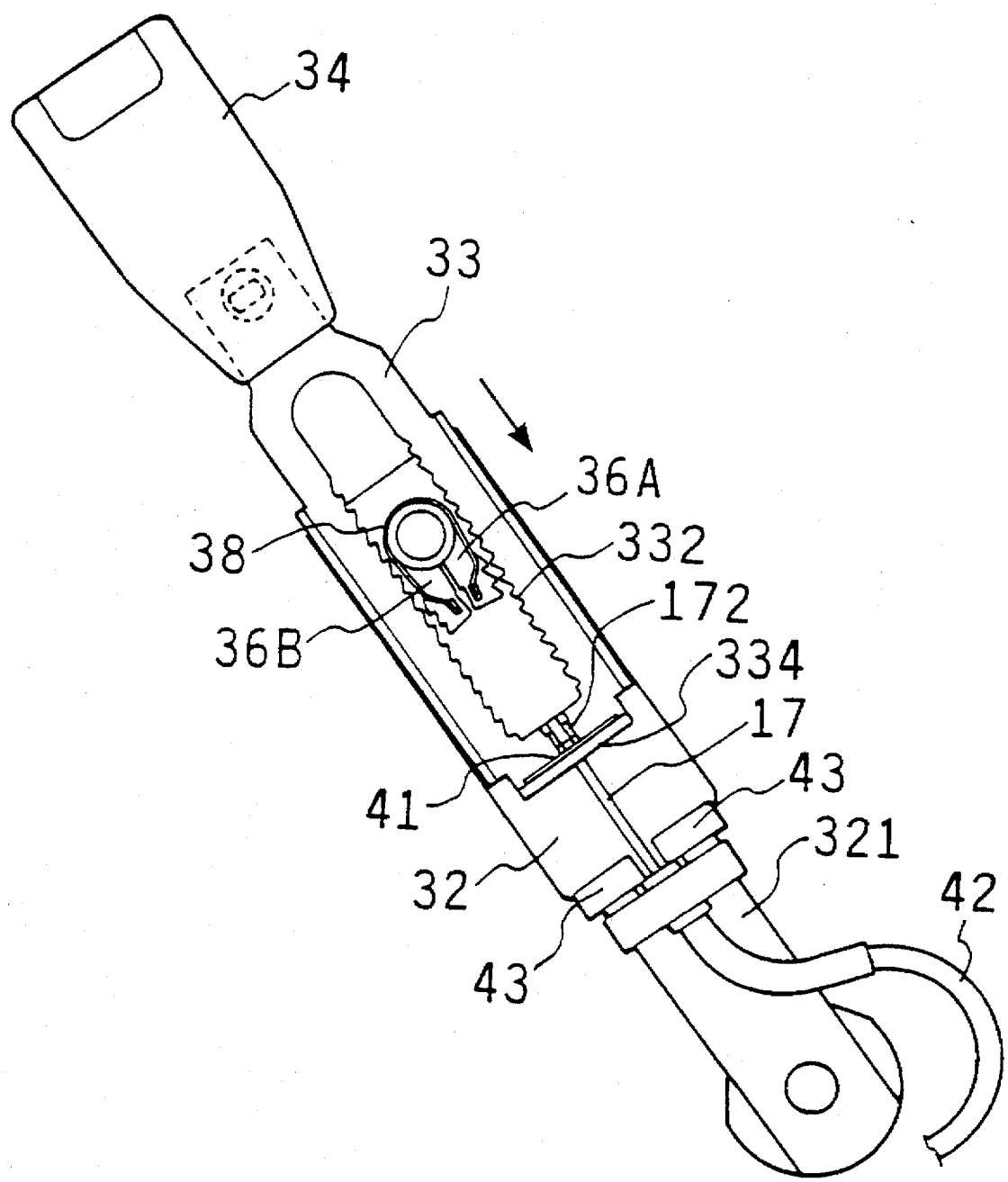
FIG. 15 is a partial cutaway front view of the reverse stop means to describe operation of the device.

However, when reverse arresting hook plate 33 moves downward upon being pulled by the wire 17, the locking pawls 36A, 36B shift freely toward the inside as the hooks 332 (FIG. 15) are pulled past. The reverse arresting hook plate 33 moves rapidly downward (direction shown by the arrow in FIG. 15) to carry out pulling in of the seat belt buckle. In movement of the reverse arresting hook plate 33, its stopper wall 334 contacts the rubber stoppers 43 on the buckle plate 32 and comes to a stop. Due to the presence of the rubber stoppers 43 the shock upon contact is cushioned.

After pulling in, the pull-out load in an upward direction acts on the reverse arresting hook plate 33 due to the forward motion of the passenger and via the seat belt buckle 34. In this case, the locking pawls 36A, 36B lock with the hooks 332 to stop pulling out of the reverse arresting hook plate 33.

Furthermore, at this time a bending force to the outside acts on both sides of the reverse arresting hook plate 33 along the long hole 331 forming the hooks 332. However, the bending is controlled by the control walls 402 on the arresting pawl holder 40 (FIG. 13).

Figure 16:
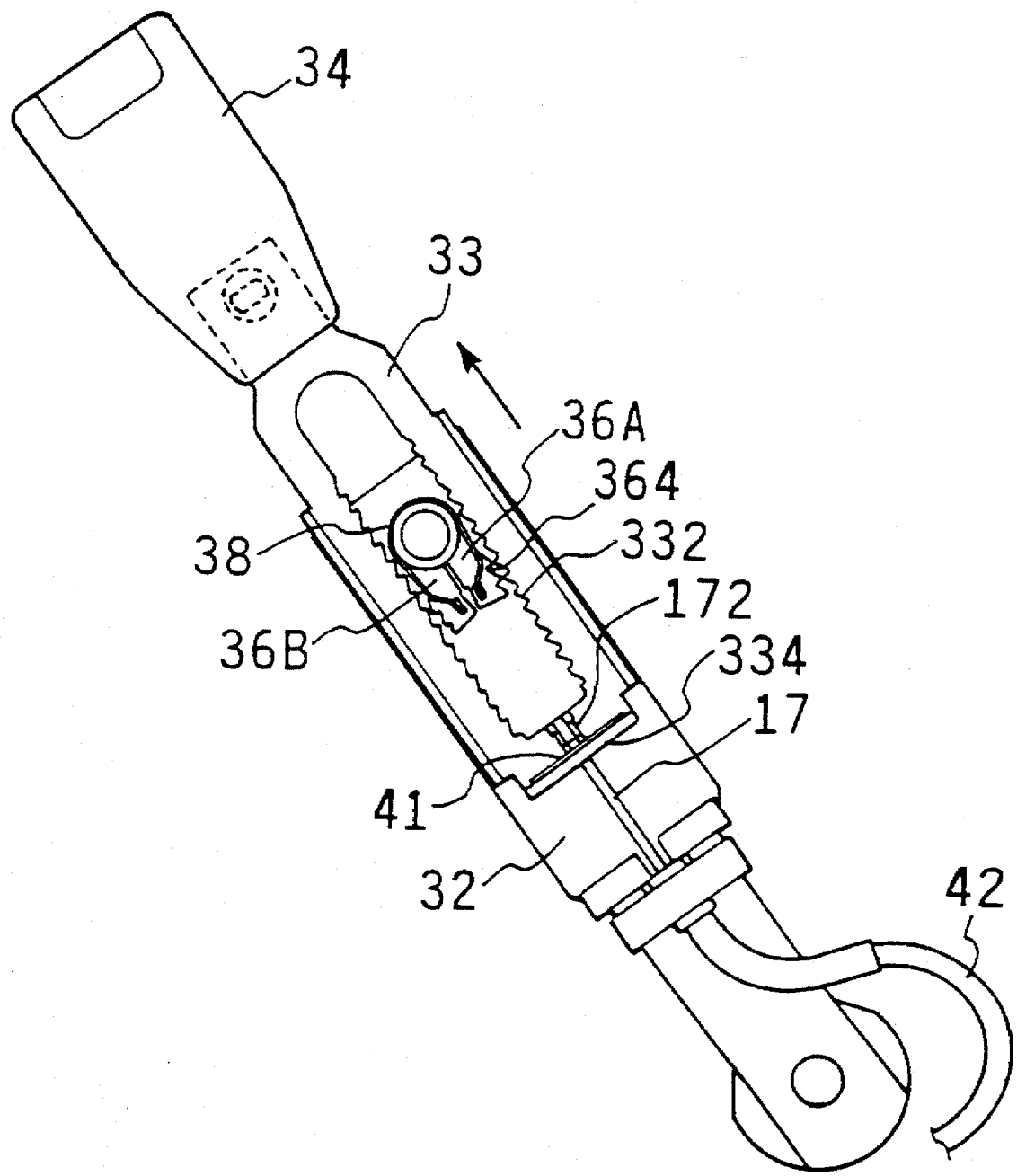
FIG. 16 is a partial cutaway front view of the reverse stop means to describe operation of the device.

When carrying out reset of the pull-in section, there is release of retention of the lower end opening of the movable cover 35 to pull this upward. Likewise, the extensions 381 on the ends of both legs of the plate spring 38 and emerging from the upper wide area of the opening 401 on the arresting pawl holder 40 (FIG. 13) are held by an instrument and moved toward the lower narrow shape of the opening 401 against the spring biasing force. As a result, the left and right locking pawls 36A, 36B are moved to an inner position where they do not interfere with the hooks 332 of the reverse arresting hook plate 33 (FIG. 16). When the seat belt buckle 34 and the reverse arresting hook plate 33 are pulled up in this state with a tool, etc. (direction shown by the arrow in figure), the wire 17 moves together with this, and because the wire 17 moves toward the back in the pull-in section, there is reset of the pull-in section according to the process described above.

Figure 17:
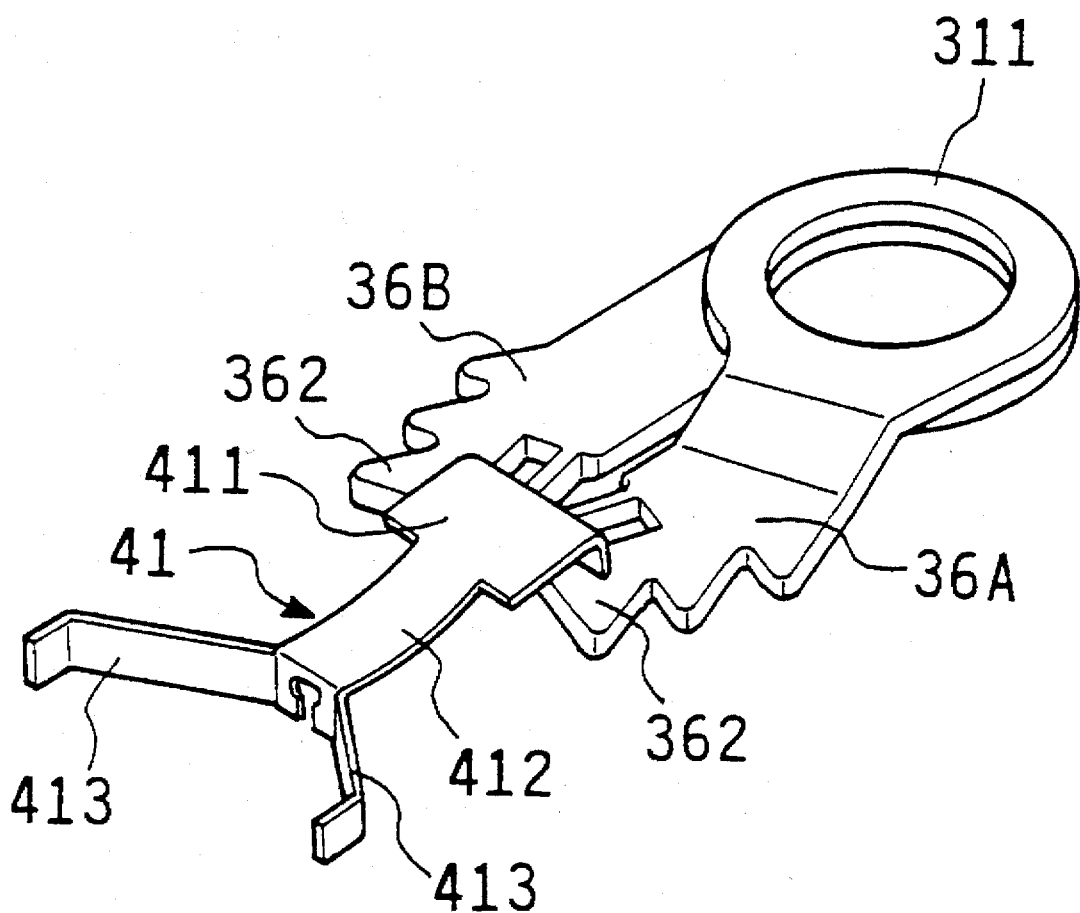
FIG. 17 is a perspective view to show the relationship between the plate spring and the reverse stop claws.
Figure 18:
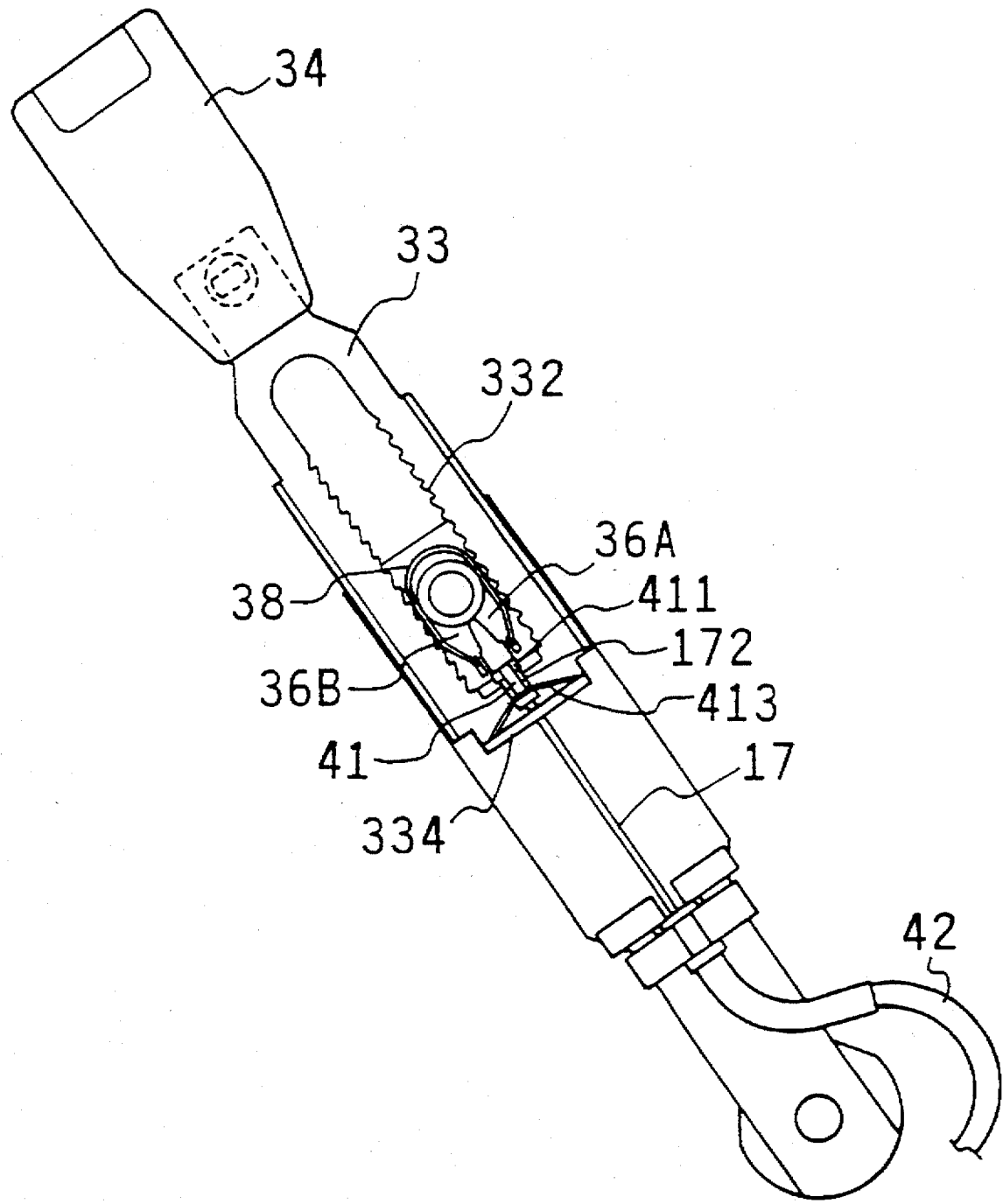
FIG. 18 is a partial cutaway front view of the reverse stop means to describe operation of the device.

Along with rising of the arresting hook plate 33, the plate spring 41 which moves as a single unit with this reaches the locking pawls 36A, 36B; and the head 411 which bends at this time rides over the lower surface of the legs 362 of the locking pawls 36A, 36B as shown in FIG. 17. Furthermore, when the arresting hook plate 33 climbs to reach the vicinity of the home position, the ends of both legs 392 of the movable plate 39 contact the stopper walls 334 (FIG. 13), thus moving upward. The lower edge 393 of the opening contacts the extensions of the leg ends 381 of the plate spring 38 and pushes them to the upper wide area of the opening 401 of the arresting pawl holder 40. As a result, the plate spring 38 regains its original shape so that the locking pawls 36A, 36B shift toward the outside and lock with the hooks 332 of the arresting hook plate 33. At the same time, the head 411 of the plate spring 41 fits by its own spring force between the locking pawls 36A, 36B which have opened to the left and right, thus preventing movement toward the inside (FIG. 18). In this way, the arresting hook plate 33 and the seat belt buckle 34 both return to their original position where there is checking of up-down movement.

In addition, the upper end of the arresting hook plate 33 where the reinforcement walls 333 is not formed, and the lower end 321 of the buckle plate 32 which is of narrow width can bend more easily than the other parts in the orthogonal direction of the plate surface. Thus, they are in a position that follows well the curves of the passenger's body when the seat belt is buckled. This curved section can be included in at least one location in the space from the lower end of the seat belt plate 32 to the seat belt buckle 34. Also, in addition to using a reinforcement wall 33 to reinforce the parts other than the curve, it is possible to form ribs or the like.

In this embodiment, as shown in FIG. 12, the following are on the same single straight line: the joining point 336 of the arresting hook plate 33 and seat belt buckle 34, the joining point 213 of the buckle plate 32 and the connecting section 212 of the housing 21 acting as the base. Thus, in response to the weight input from the direction of a straight line, there is no generation of moment force, making it possible to create sufficient strength.

Also, instead of passing the wire 17 travelling from the pull-in section to the reverse preventing section in the flexible tube 42, it can also be suspended with a pulley, etc.

Figure 19:
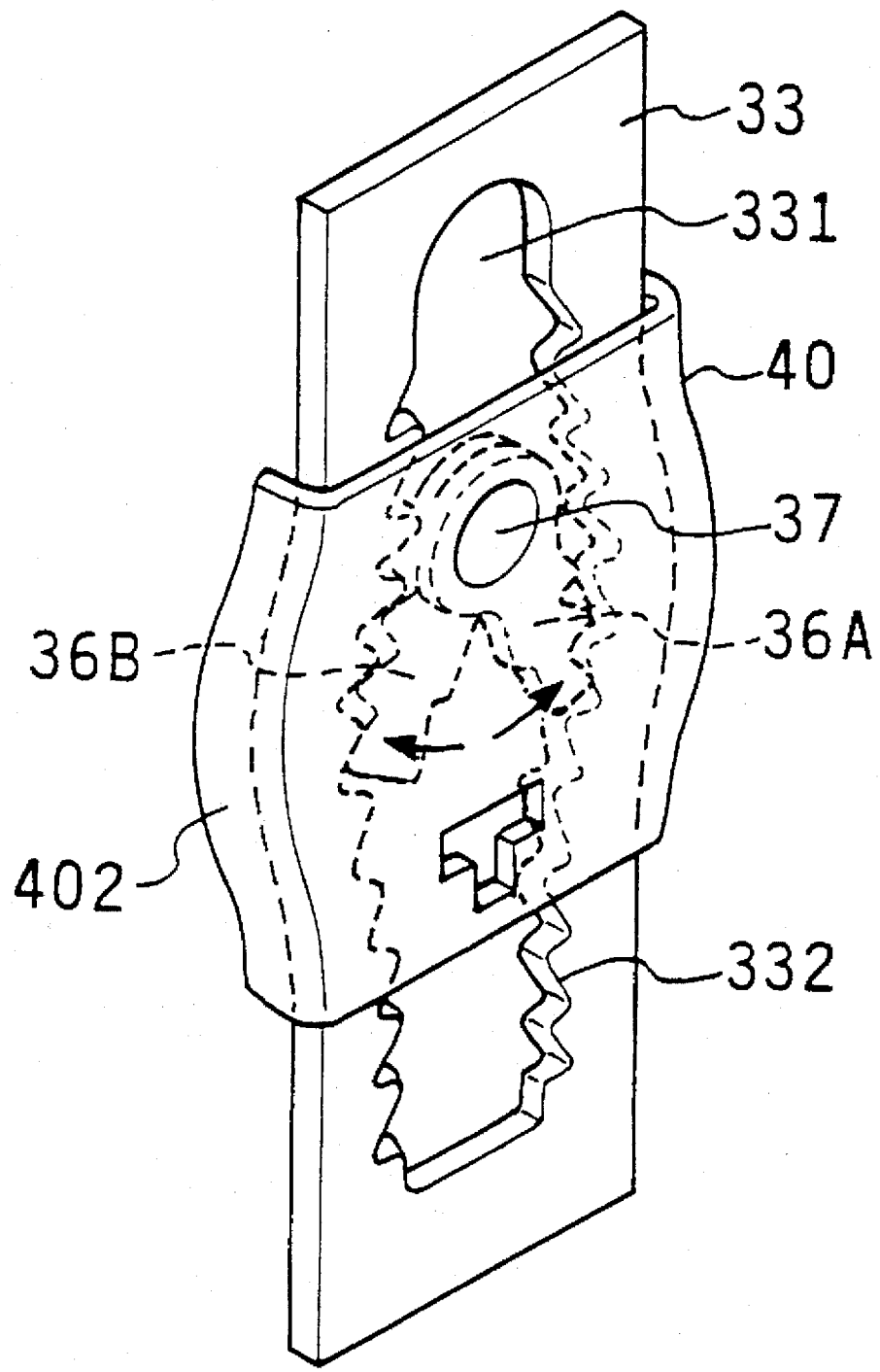
FIG. 19 is a perspective view showing a deformation state of arresting hook plate and the locking pawl holder that covers it.

By appropriately setting the strength of the control walls 402 of the arresting pawl holder 40, if an excessive load acts to the point where the seat belt stretches, then, as shown in FIG. 19, the control walls 402 and side of the long hole of the arresting hook plate 33 on the inside change shape toward the outside so that it is not possible to re-use the seat belt tightening device.

[Second Embodiment]

Figure 20:
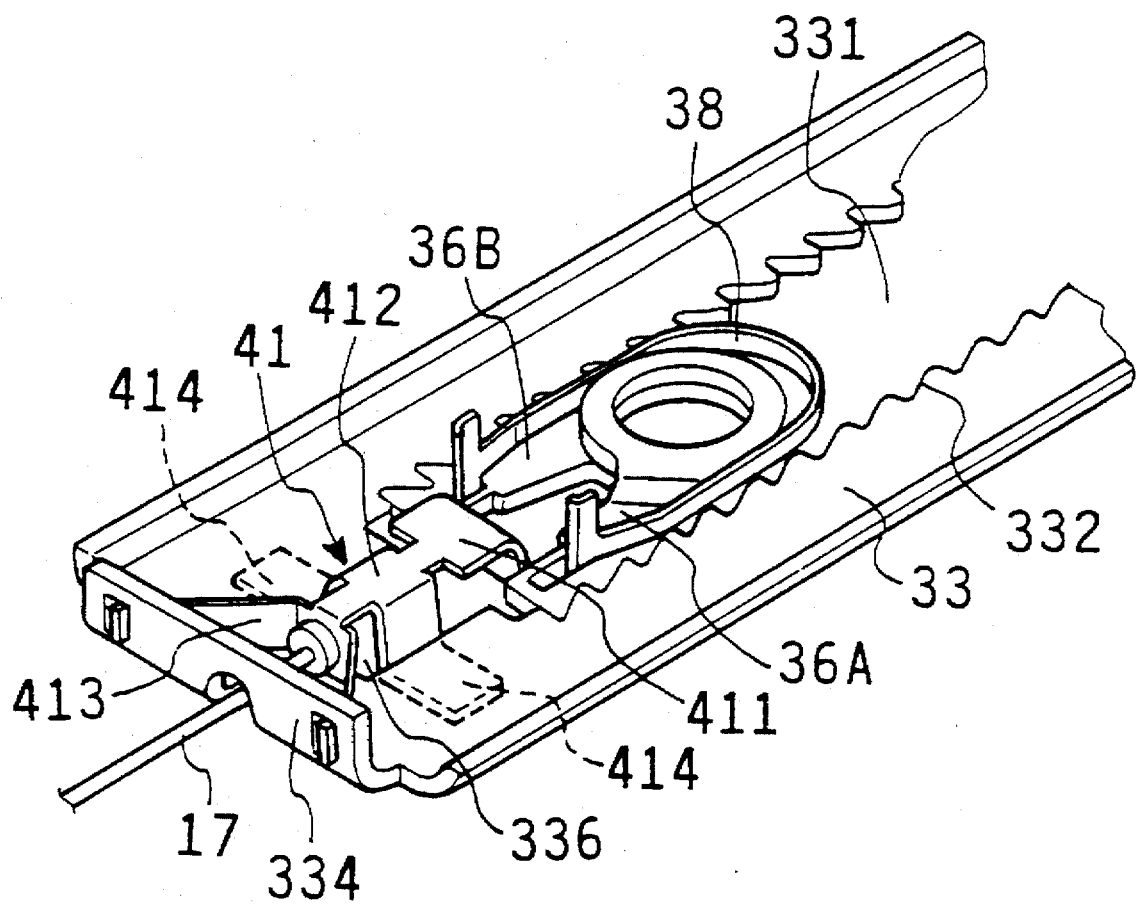
FIG. 20 is a partial perspective view of the end of the arresting hook plate in the second embodiment of this invention.

As shown in FIG. 20, rectangular stop plates 414 on the left and right positions of the connecting section 412 are caused to protrude from the plate spring 41 acting as the engagement-release prevention means. These rectangular stop plates 414 are inserted in the opening 336 formed in the plate surface of the arresting hook plate 33 acting as the support means and are brought in contact with the back surface.

By means of this structure, even if the weight acts in a direction to pull up the plate spring 41, that plate spring 41 is maintained in this way without separating from the plate surface of the arresting hook plate 33.

[Third Embodiment]

Figure 21:
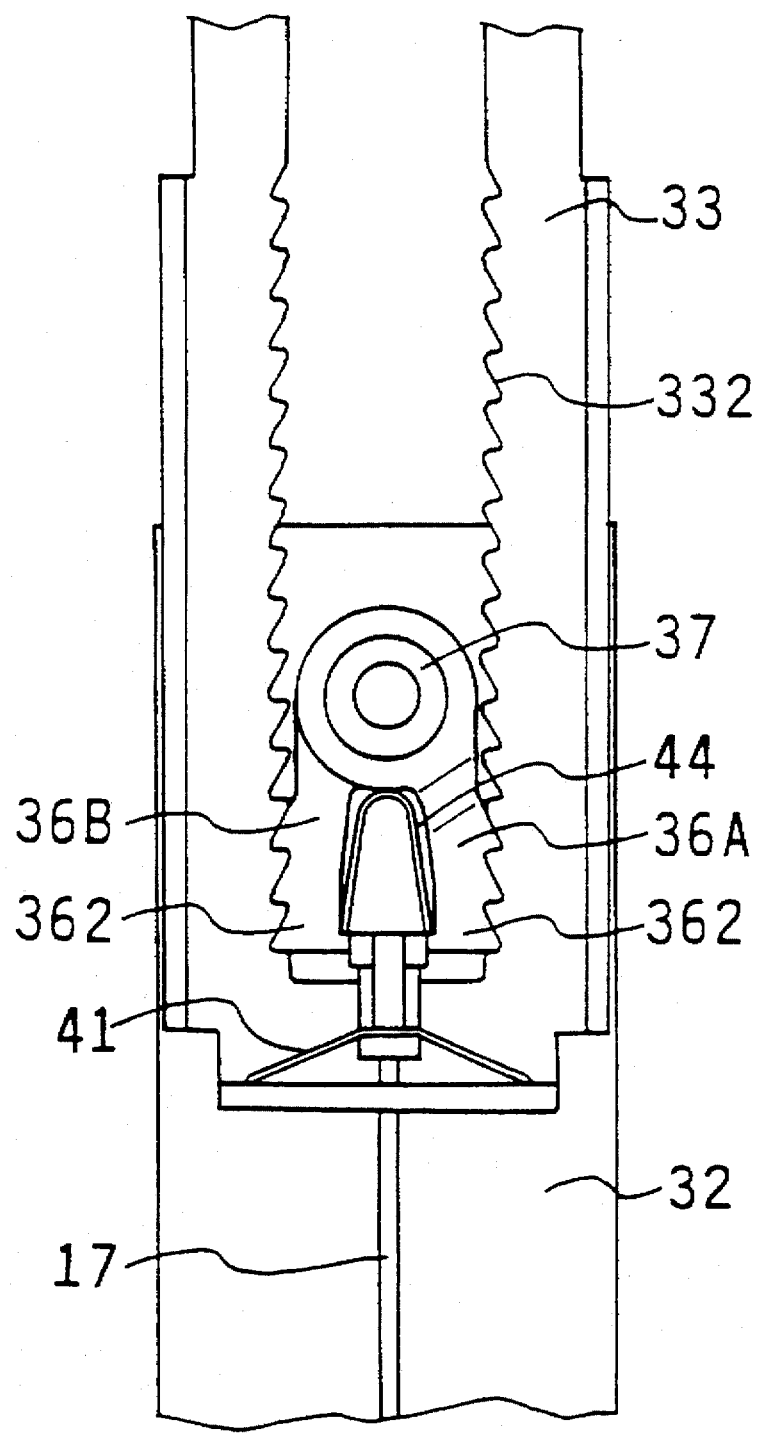
FIG. 21 is a of the end of the arresting hook plate in the third embodiment of this invention.

As shown in FIG. 21, in order to open and energize the left and right locking pawls 36A, 36B in a locking direction, a structure is possible in which a plate spring 44 in the shape of an upside-down U is inserted between the legs 362 of the locking pawls 36A, 36B to energize the legs 362 in an outward direction.

[Fourth Embodiment]

Figure 22:
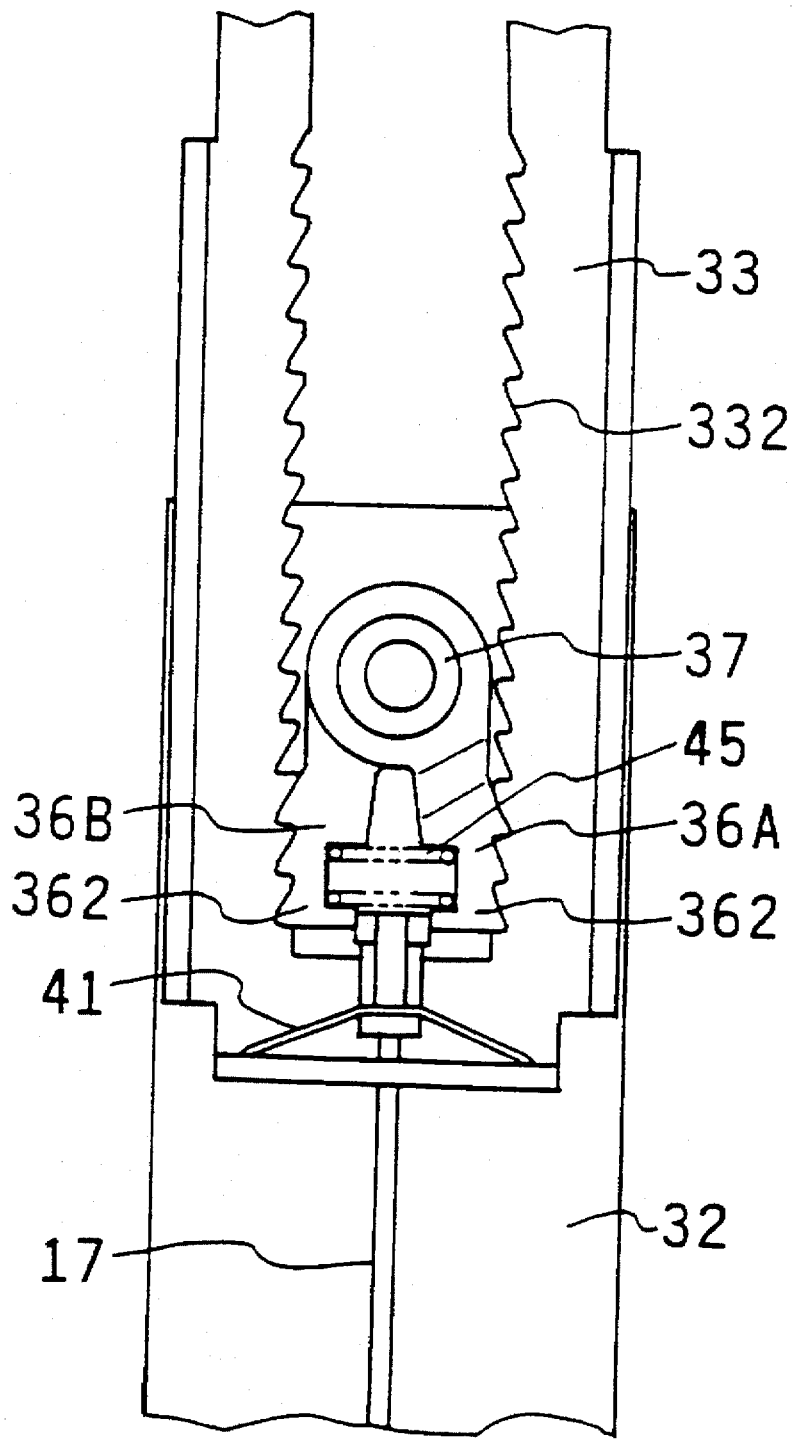
FIG. 22 is a partial front view of the end of the arresting hook plate in the fourth embodiment of this invention.

Also, as shown in FIG. 22, it is possible to insert a coil spring 45 between the legs 362 of the locking pawls 36A, 36B to energize the legs 362 in an outward direction.

[Fifth Embodiment]

Figure 23:
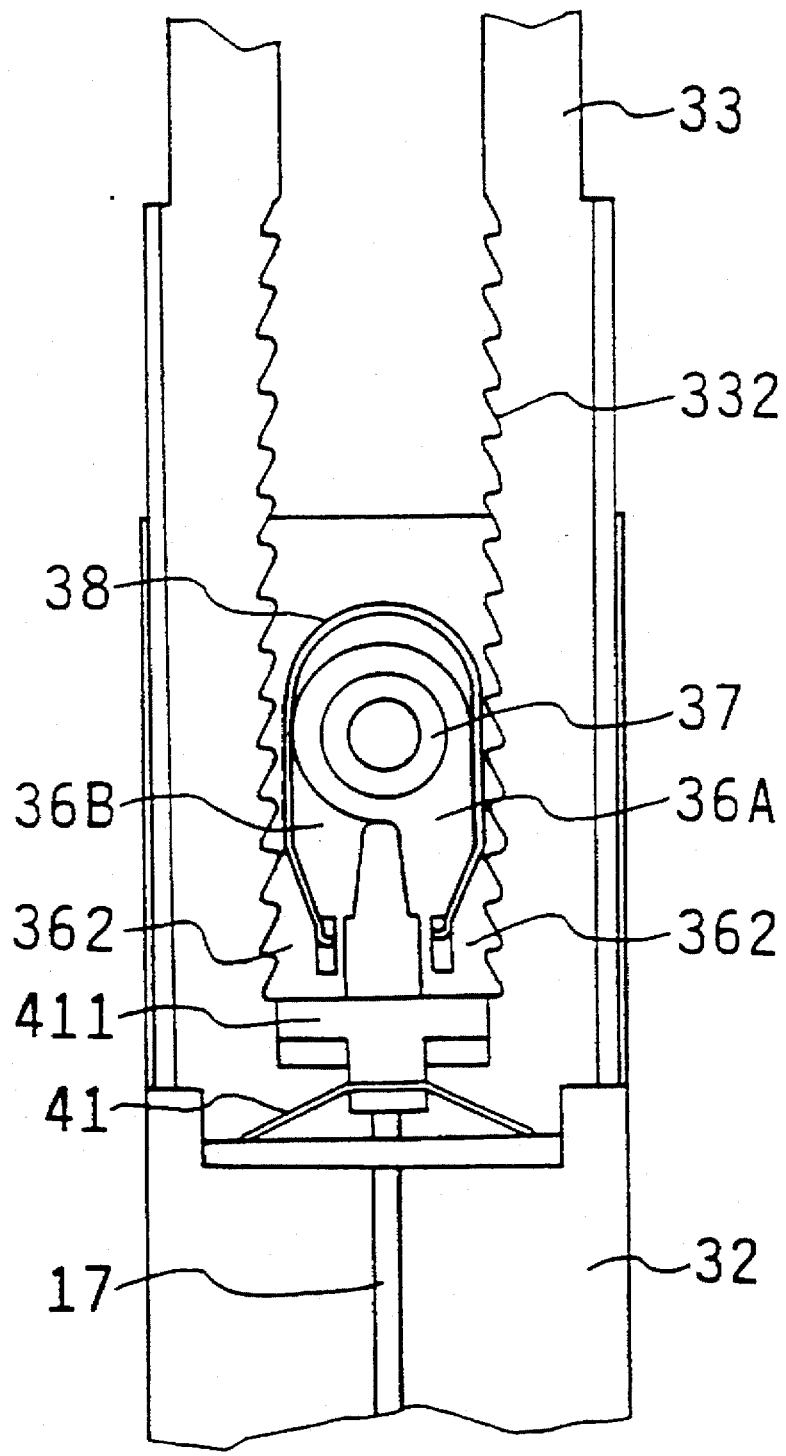
FIG. 23 is a partial front view of the end of the arresting hook plate in the fifth embodiment of this invention.

As shown in FIG. 23, a structure is also possible in which the head 411 of the plate spring 41 acting as the engagement-release prevention means is formed in a T-shape, and the end of the head 411 is brought into contact with the ends of the two legs 362 of the locking pawls 36A, 36B, thus preventing movement of the legs 362 in an inward direction.

[Sixth Embodiment]

Figure 24:
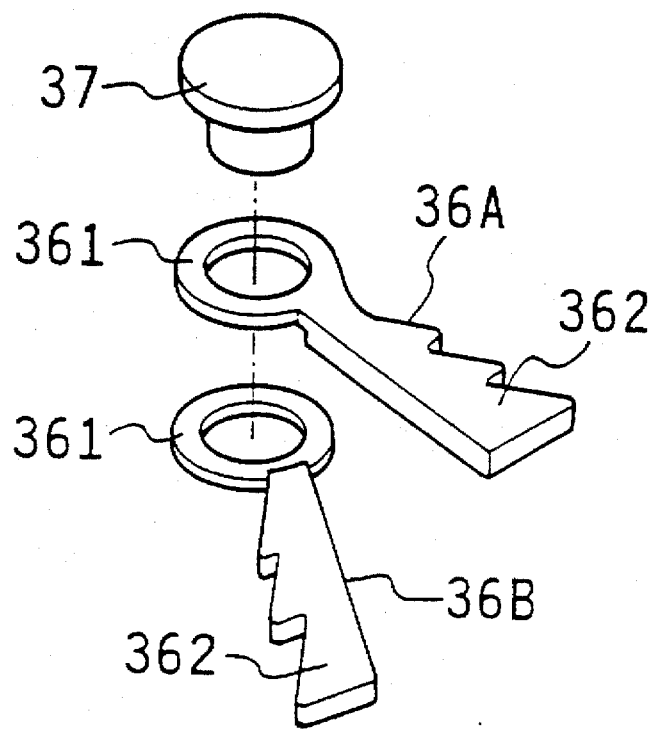
FIG. 24 is an exploded view of the end of the locking pawl in the sixth embodiment of this invention.

A structure is created in which legs 362 of the locking pawls 36A, 36B are caused to move on the same plane surface, and moreover, as shown in FIG. 24, the leg 362 of one locking pawl 36A is made thicker than the head 361.

[Seventh Embodiment]

Figure 25:
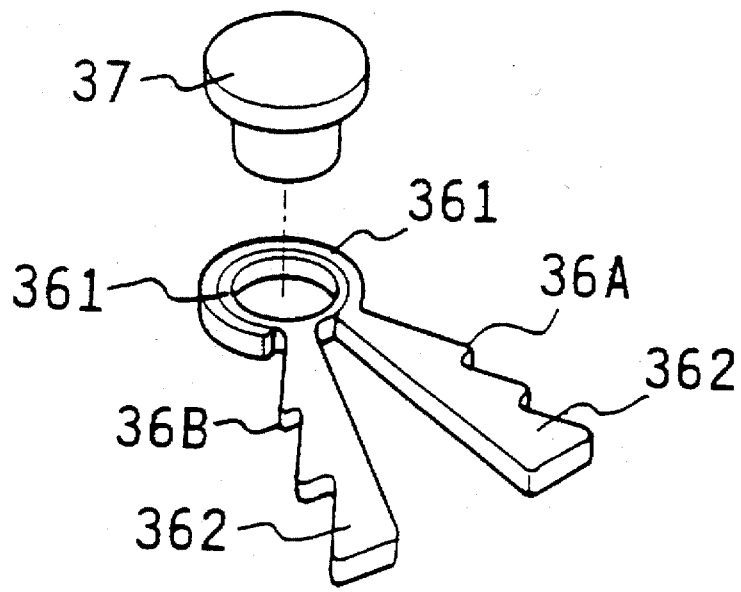
FIG. 25 is an exploded view of the end of the arresting pawl in the seventh embodiment of this invention.

As shown in FIG. 25, the same effect can be obtained by forming the head 361 of one locking pawl 36A in the shape of an incomplete ring that fits around the circumference of the head 361 of the other locking pawl 36B.

[Eighth Embodiment]

Figure 26:
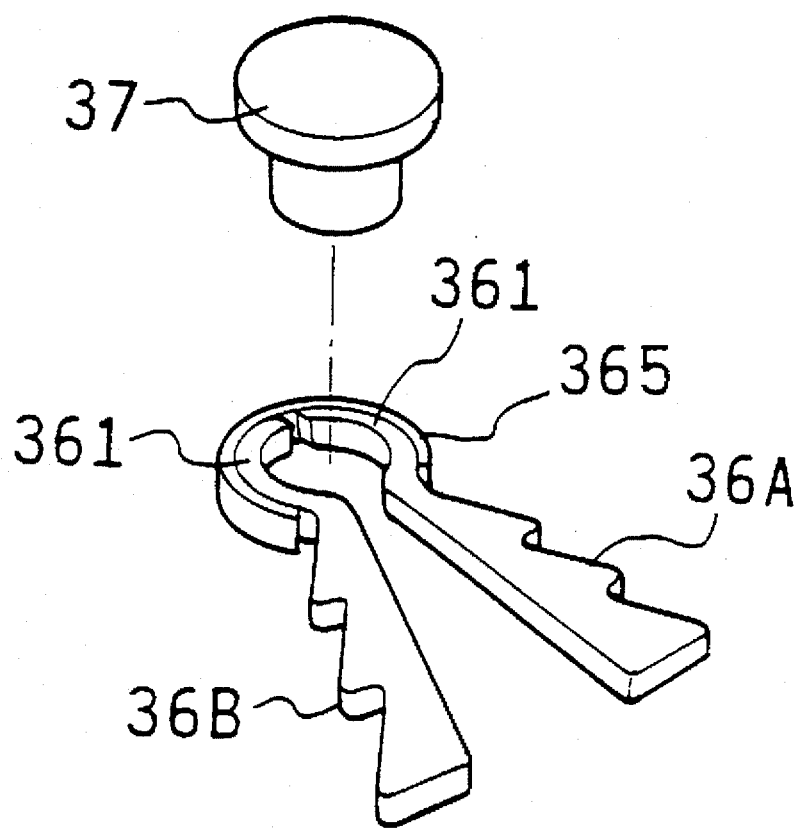
FIG. 26 is a an exploded view of the end of the locking pawl in the eighth embodiment of this invention.

Also, as shown in FIG. 26, the heads 361 of the locking pawls 36A, 36B are bent in an arc shape, and an axis 37 is constructed on the inner circumference of the heads 361, which an incomplete ring is constructed along the outer circumference.

[Ninth Embodiment]

Figure 27:
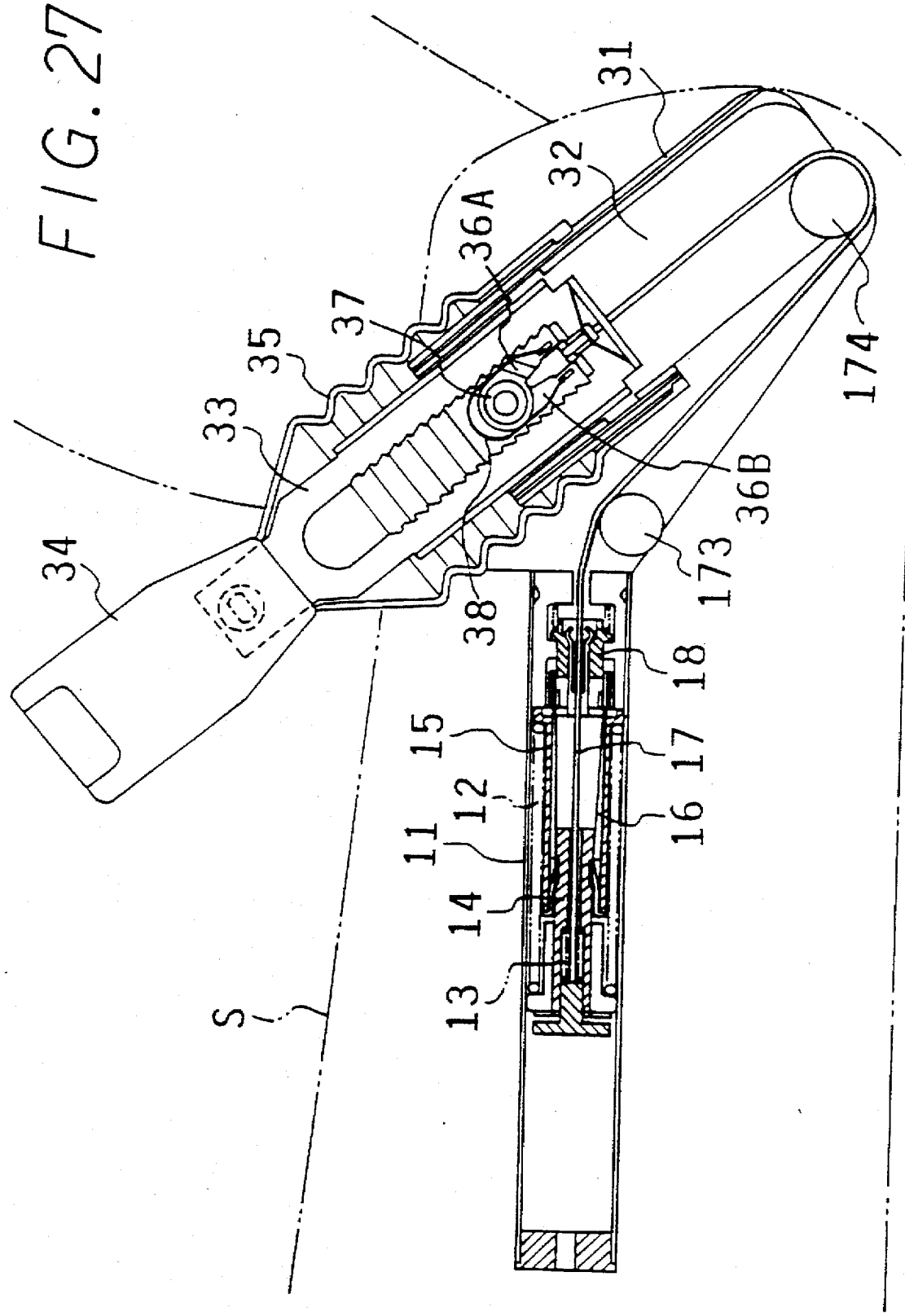
FIG. 27 is an entire cross-section view of the device in the ninth embodiment of this invention.

In order to attach the seat belt tightening device, instead of securing the casing 11 of the pull-in section to the vehicle floor as in embodiment 1 above, it is also possible to secure the axis 37 of the reverse stop section to the seat S, as shown in FIG. 27. Because it is possible with this method to make the distance sufficiently small between the seat belt buckle 34 and the attachment location, it is helpful in terms of increasing strength. Also, it is possible to simultaneously carry out locking of the elements of the reverse stop section such as the locking pawls 36A, 36B and the locking pawl holder 40, as well as retention of the device, thus simplifying installation.

[Tenth Embodiment]

Figure 28:
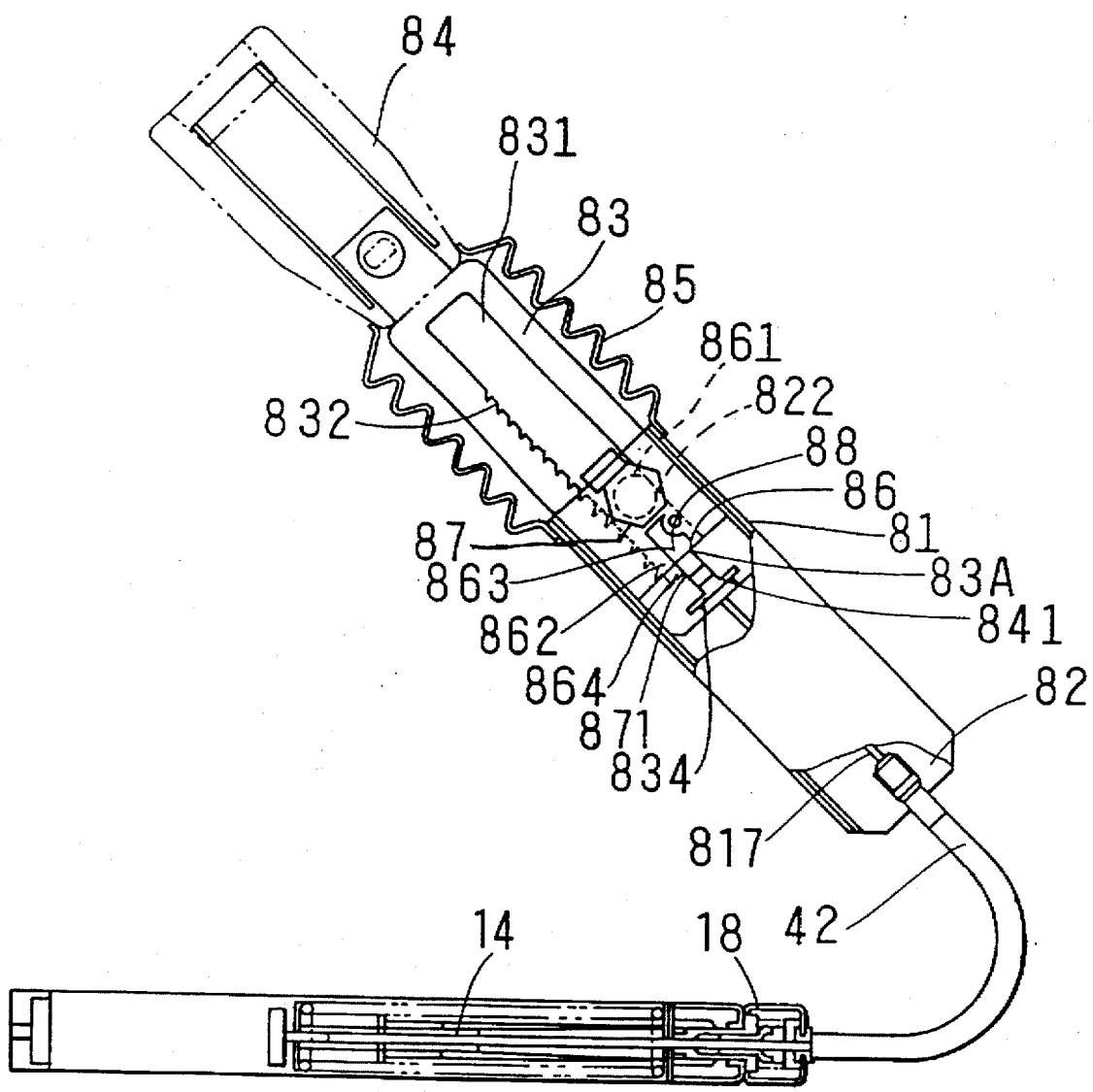
FIG. 28 is a partial cutaway entire device of this invention.

In FIG. 28, the retention cover 81 of the reverse prevention section has the form of a flat rectangular container. Attached to the lower end of the buckle plate 82 located inside the cover 81 is one end of a wire covering 42 achieved by processing part of the buckle plate.

Contacting the plate surface of the buckle plate 82 and slightly narrower is a reverse prevention hook plate 83 capable of rubbing movement. The reverse prevention hook plate 83 is a long plate extending out as an extension of the buckle plate 82. Located in the center of the plate surface is a long hole 831 extending in a longitudinal direction. Formed on the sides of the long hole 831 are multiple hooks 832 with a sawtooth configuration. Secured to the upper end of the reverse prevention hook plate 83 is a seat belt buckle 84. The entire reverse prevention hook plate 83 with the exception of the seat belt buckle 84 is housed in a movable cover 85. The movable cover 85 is in the shape of a flat rectangular container of which the entire surface is bellows-shaped and capable of expanding and contracting. The upper end opening is secured to the seat belt buckle 84 and the lower end opening is secured to the retention cover 81.

Figure 29:
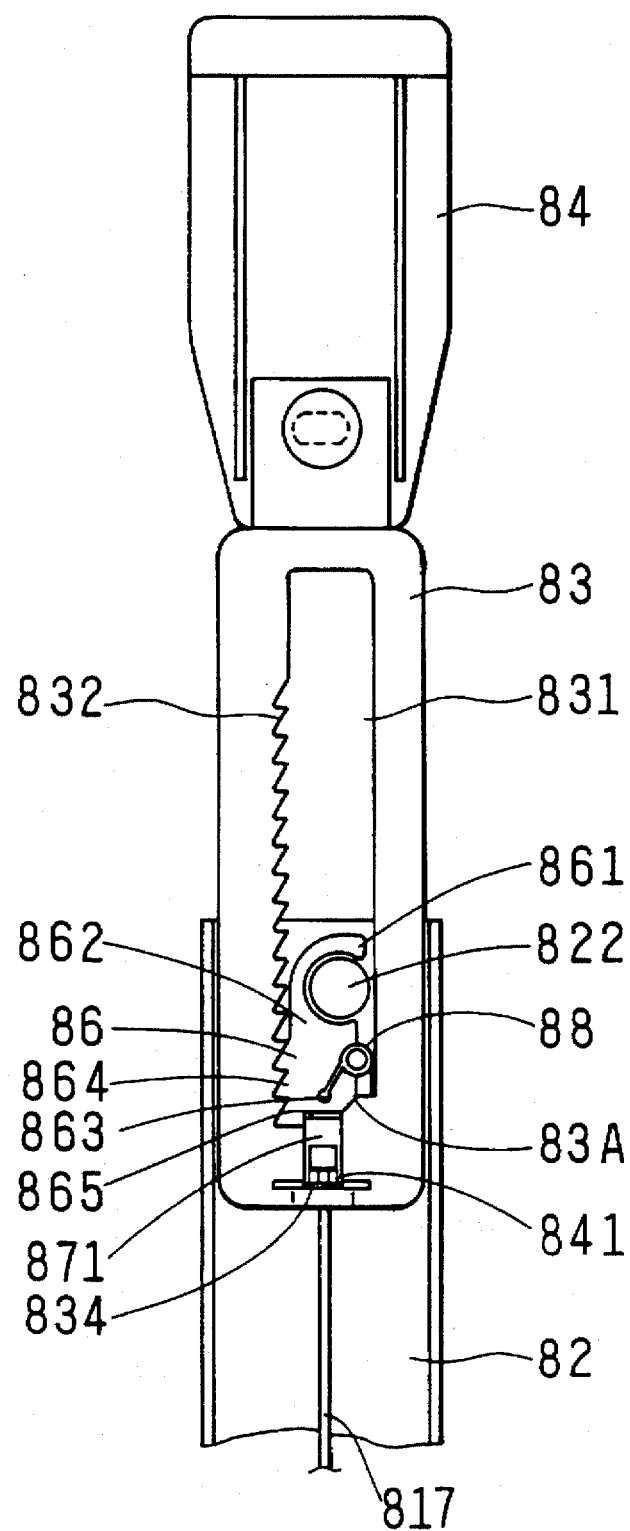
FIG. 29 is a partial cutaway enlargement front view of the reverse preventing section of this invention.

FIG. 29 shows the internal structure of the reverse prevention section. Formed on the inside of the long hole 831 of the reverse prevention hook plate 83 is a reverse prevention locking pawl 86. The reverse prevention locking pawl 86 is made of pressed metal plate and composed of a ring-shaped head section 861 on one end and a foot section 862 extending out from this.

The reverse prevention locking pawl 86 is retained on the periphery of a bolt 87 (FIG. 28) inserted in the attachment hole 822 of the buckle plate 82 so that it can move freely. A hole 863 is included on the leg section 862 of the reverse prevention locking pawl 86. One end of a helical torsion spring 88 is inserted in the hole 863. The leg 862 of the reverse prevention locking pawl 86 located inside the hole 831 of the reverse prevention hook plate 83 is energized in the direction of the hooks 832 by means of the helical torsion spring 88. The multiple sawtooth shaped pawls 864 formed in outer side surface of the leg section 862 interlock with the hooks 832 of the prevention hook plate 83 on the other side and prevent upward movement.

The wire head section 871 is inserted in the lower part of the reverse prevention locking pawl 86 where the reverse prevention hook plate 83 has been cut out. The wire head section 871 is furthermore energized in an upward direction by the coil spring 841, i.e., in the direction of the reverse prevention locking pawl 86. When the reverse prevention hook plate 83 has been pulled up with the seat belt buckle 84 to the highest position as shown in FIG. 29, the head section 871 of the wire 817 is inserted in the notch 865 formed in the bottom of the reverse prevention locking pawl 86 to prevent movement of the reverse prevention locking pawl 86 towards the interior. As a result, in this condition the reverse prevention locking pawl 86 does not come off the hook 332 of the reverse prevention hook plate 83, and the reverse prevention hook plate 83 (i.e., the seat belt buckle 84) is prevented from moving in either an upward or downward direction.

When pulling in of the wire 817 in the pull-in section is produced by the process described above, the wire 817 in the reverse prevention section moves downward so that the head section 871 pushes against the coil spring 841 and contacts the lower end stopper wall 834 of the reverse prevention hook plate 83. Simultaneously, the head section 871 comes free from the notch 865 of the reverse prevention locking pawl 86, thus allowing movement of the reverse prevention locking pawl 86 towards the inside.

However, when the reverse prevention hook plate 83 moves downward upon being pulled by the wire 817, the reverse prevention locking pawl 86 displaces freely to the inside passing the hooks 832 and travelling over them. The reverse prevention hook plate 83 moves quickly downward so that pulling in of the seat belt buckle 84 is carried out.

After pulling in, due to forward movement of the passenger the pull-out weight acts on the reverse prevention hook plate 83 in an upward direction via the seat belt buckle 84. In this case, the reverse prevention locking pawl 86 interlocks with the hooks 832 to prevent pulling out of the reverse prevention hook plate 83.

During reset, due to the movement of the passenger, there is release of the lock between the reverse prevention hook plate 83 and the reverse prevention locking pawl 86 in opposition to the coil spring 88, thus pulling up the reverse prevention hook plate 83 supporting the seat belt support 84 and allowing reset of the device.

At this time, there is a tapered guide surface 83A on the reverse prevention hook plate 83. When pulled up to the highest level, the reverse prevention locking pawl 86 is guided along the guide surface 83A to lock with the reverse prevention hook plate 83. Furthermore, the wire head section 871 is energized by the coil spring 841 to move to the side of the support 84 where it is inserted in the notch 865, thus preventing movement of the reverse prevention locking pawl 86 to the inside.

Connection of the pull-in section and the reverse prevention section is described.

The pull-in section and reverse prevention section are connected by a wire 817 covered with a flexible covering 42, (FIG. 28) thus allowing attachment of the pull-in section to an arbitrary position and facilitating attachment to narrow seats.

As explained above, with the seat belt tightening device in this invention, there is protection of the body of the passenger even in poor road driving conditions by operating the device, and there is realization of a simpler and more compact device structure. As a result, it can be used effectively for mounting in a car. It is also easy to reset to the state prior to start of operation.

What is claimed is:

1. A seat belt tightening device comprising:
   a seat belt suspension component, said suspension component having an initial position;
   a support component supporting said suspension component;
   a holder accommodating said support component so that said suspension component moves freely in a straight line, said holder being fixed to a vehicle;
   a pull-in component operatively coupled to said suspension component so as to move said suspension component in a pull-in direction when an inertia force greater than a predetermined value acts thereon; and
   a restrictor operatively coupled to said suspension component, said restrictor having a restrict state and a release state, and wherein in said restrict state said restrictor restricts movement of said suspension component at least in a pull-out direction;
   a restriction-release mechanism permitting selective release of said restrict state of said restrictor and holding of said release state of said restrictor during which said suspension component is returned to said initial position;
   a restriction-return means for returning said restrictor to said restrict state when said suspension component is moved in a pull-out direction so as to be returned to said initial position.

2. A seat belt tightening device according to claim 1, wherein said restrictor and said restriction-release mechanism are disposed in one of said holder and said support component.

3. A seat belt tightening device according to claim 1, wherein said restrictor includes an engagement hook defined on said support component and an engagement pawl engaging and releasing from said engagement hook, said engagement pawl being pivotably supported by said holder.

4. A seat belt tightening device according to claim 3, further comprising;
   a connector connecting said pull-in component and said support component;
   an engagement pawl restricting means for selectively preventing said engagement pawl from disengaging from said engagement hook, one end of said connector being connected to said engagement pawl restricting means, whereby movement of said engagement pawl restricting means in the pull-in direction releases the restrict state in which said engagement pawl and said engagement hook engage.

5. A seat belt tightening device according to claim 4, further comprising a guide portion pushing said engagement pawl to said engagement hook when said suspension component is returned to said initial position.

6. A seat belt tightening device comprising:
   a seat belt suspension component having an initial position;
   a support component supporting said suspension component;
   a holder accommodating said support component so that said suspension component moves freely in a straight line, said holder being fixed to a vehicle;
   a pull-in component operatively coupled to said suspension component so as to move said suspension component in a pull-in direction when an inertia force greater than a predetermined value acts thereon; and
   a restrictor having an engagement state for restricting movement of said suspension component at least in a pull-out direction;
   an engagement-release preventing means selectively disposed to prevent release of said engagement state of said restrictor so that said engagement-release preventing means holds said engagement state even if a force is applied from a side of said suspension component, said engagement-release preventing means permitting a release of said engagement state in response to a force in a pull-in direction applied thereto and generated by said pull-in component.

7. A seat belt tightening device according to claim 6, further comprising connector connecting said pull-in component and said support component, said engagement-release preventing means being disposed at one end of said connector.

8. A seat belt tightening device according to claim 6, wherein said restrictor includes an engagement hook defined on said support component and an engagement pawl engaging and releasing from said engagement hook, said engagement pawl being pivotably supported by said holder.

9. A seat belt tightening device according to claim 8, further comprising a guide portion pushing said engagement pawl to said engagement hook when said suspension component is returned to said initial position.

10. The seat belt tightening device according to claim 8, wherein said guide portion is disposed at said support component to engage with said restrictor upon completion of movement of said suspension component to said initial position.

11. The seat belt tightening device according to claim 10, further comprising a spring means for biasing said engagement-release preventing means toward said disposition preventing release of said engagement state upon completion of said movement to said initial position.

12. The seat belt tightening device according to claim 8, further comprising a coil spring biasing said engagement pawl toward said engagement hook.

13. A seat belt tightening device comprising:

a seat belt suspension component;

a support component supporting said suspension component;

a holder accommodating said support component so that said support component moves freely on a straight line, said holder being fixed to a seat;

a pull-in component which moves suddenly in response to a spring biasing force when inertia above a set amount acts thereon;

a connector connecting said pull-in component to said support component and whereby said support component moves in a pull-in direction together with movement of said pull-in component; and a restrictor mounted to said holder so as to be engageable with said support component and restricting a movement of said support component at least in a pull-out direction.

14. The seat belt tightening device according to claim 13, wherein said holder is fixed to the seat with a support structure which mounts said restrictor to said holder.

15. A seat belt tightening device comprising:

a seat belt suspension component;

a support component supporting said suspension component;

a holder for accommodating said support component so that said suspension component moves freely on a straight line;

a pull-in component which moves suddenly in response to a spring biasing force when inertia above a set amount acts thereon;

a connector connecting said pull-in component to said support component and cause said support component to move in a pull-in direction together with movement of said pull-in component;

a restrictor mounted to said holder so as to be engageable with said support component and restricting a movement of said support component at least in a pull-out direction;

an engagement selection means to select and set the engaging and release of said restrictor; and a reset mechanism which, acting via said connector, resets said pull-in component upon returning said pull-in component to an original position thereof against the spring biasing force with said connector.

16. The seat belt tightening device according to claim 15, wherein said support component is a long plate having a plurality of sawtoothed hooks in a longitudinal direction, and said restrictor comprises a plate having sawtoothed pawls for engaging with said hooks, and furthermore comprises a spring to energize said plate in a direction such that said pawls engage with said hooks.

17. The seat belt tightening device according to claim 16, wherein said long plate has a long hole extending longitudinally in a center thereof and said hooks are on both sides of said long hole, parallel to each other, and said restrictor comprises a pair of plates disposed opposite to said hooks on both sides of said long hole.

18. The seat belt tightening device according to claim 17, wherein said pair of plates forming said restrictor are freely rotatably supported on one end by a common axis and so that they are biased by said spring to open in a V-shape, whereby said pawls formed on the edges of said plates are caused to engage with said hooks opposing them.

19. The seat belt tightening device according to claim 18, wherein said engaging selection means has a retention means for retaining said spring in a deformed position wherein said spring is deformed against its biasing force and engagement between said pawls and said hooks is released.

20. The seat belt tightening device according to claim 19, wherein said support component has two longitudinally extending sides, and said engaging selection means further comprises a control wall to limit bending of said support component by contacting from the outside with both said sides of said support component, in a range where said pawls of said restrictor engage.

21. The seat belt tightening device according to claim 20, wherein said holder is pivotally connected to a seat, wherein a connecting point where said holder is connected to the seat, a connecting point where an end of said support component connects to said suspension component, and said common axis are disposed on the same straight line.

* * * * *